(12) United States Patent
Takabatake et al.

(10) Patent No.: US 6,829,228 B2
(45) Date of Patent: Dec. 7, 2004

(54) INFORMATION TRANSFER METHOD RADIO TERMINAL AND RADIO GATEWAY DEVICE USING DATALINK LAYER SIGNALING OF PROTOCOL INDENTIFIER

(75) Inventors: Yoshiaki Takabatake, Kanagawa (JP); Keiichi Teramoto, Tokyo (JP); Kensaku Fujimoto, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 749 days.

(21) Appl. No.: 09/748,017

(22) Filed: Dec. 27, 2000

(65) Prior Publication Data

US 2001/0006518 A1 Jul. 5, 2001

(30) Foreign Application Priority Data

Dec. 27, 1999 (JP) .......................................... P11-371761

(51) Int. Cl.[7] .............................................. H04L 12/28
(52) U.S. Cl. ........................ 370/338; 370/340; 370/401
(58) Field of Search ................................ 370/338, 407, 370/389, 395.2, 399, 395.3, 395.31

(56) References Cited

U.S. PATENT DOCUMENTS 6,523,696 B1 * 2/2003 Saito et al. .................. 209/223

6,728,244 B1 * 4/2004 Takabatake ................. 370/392

FOREIGN PATENT DOCUMENTS

| EP | 0 848 568 | 6/1998 |
|---|---|---|
| EP | 0 969 628 | 1/2000 |
| WO | WO 94/22253 | 9/1994 |

* cited by examiner

Primary Examiner—Kenneth Vanderpuye
(74) Attorney, Agent, or Firm—Oblon, Spivak, McClelland, Maier & Neustadt, P.C.

(57) ABSTRACT

A radio terminal or gateway capable of executing the AV/C protocol on the datalink protocol which starts communications after setting up a logical channel on a radio network is disclosed. The radio terminal or gateway transfers data packets according to the stored correspondence information among the protocol identifier, the channel identifier that is set up for the radio terminal or gateway, and the channel identifier that is set up for a correspondent radio terminal or gateway, where the correspondence information is obtained through an exchange of signaling packets containing the channel identifier indicating a logical channel that is set up for transferring the data packets and the protocol identifier indicating the AV control protocol.

32 Claims, 16 Drawing Sheets

FIG. 3

CORRESPONDENCE TABLE #1

(a)

| PROTOCOL | OWN CHANNEL ID | CORRESPONDENT CHANNEL ID | CORRESPONDENT NODE ID |
|---|---|---|---|
| P | [A] | [B] | [Y] |
| P1 | [B] | [D] | [Z1] |
| P2 | [C] | [A] | [Z2] |
| ... | ... | ... | ... |

CORRESPONDENCE TABLE #2

(b)

| PROTOCOL | OWN CHANNEL ID | CORRESPONDENT CHANNEL ID | CORRESPONDENT NODE ID |
|---|---|---|---|
| P | [B] | [A] | [X] |
| P1 | [A] | [B] | [Z3] |
| P2 | [C] | [B] | [Z4] |
| ... | ... | ... | ... |

FIG. 9

CORRESPONDENCE TABLE #1

| PROTOCOL | OWN CHANNEL ID | CORRESPONDENT CHANNEL ID | CORRESPONDENT NODE ID |
|---|---|---|---|
| AV/C | [A] | [B] | [Y] |
| P1 | [B] | [D] | [Z1] |
| P2 | [C] | [A] | [Z2] |
| ... | ... | ... | ... |

(a)

CORRESPONDENCE TABLE #2

| PROTOCOL | OWN CHANNEL ID | CORRESPONDENT CHANNEL ID | CORRESPONDENT NODE ID |
|---|---|---|---|
| AV/C | [B] | [A] | [X] |
| P1 | [A] | [A] | [Z3] |
| P2 | [C] | [B] | [Z4] |
| ... | ... | ... | ... |

| PROTOCOL | OWN RADIO CHANNEL ID | CORRESPONDENT RADIO CHANNEL ID | CORRESPONDENT TERMINAL ID | Transaction ID | OWN 1394 NODE ID | CORRESPONDENT 1394 NODE ID |
|---|---|---|---|---|---|---|
| AV/C | [A1] | [B1] | [B] | [M] | [Y] | [X] |
| P1 | [B] | [D] | [Z1] | | | |
| P2 | [C] | [A] | [Z2] | | | |
| ... | ... | ... | ... | | | |

(b)

| PROTOCOL | OWN RADIO CHANNEL ID | CORRESPONDENT RADIO CHANNEL ID | CORRESPONDENT TERMINAL ID | Transaction ID | OWN 1394 NODE ID | CORRESPONDENT 1394 NODE ID |
|---|---|---|---|---|---|---|
| AV/C | [A2] | [B2] | [B] | [N] | [Y] | [X] |
| P1 | [B] | [D] | [Z1] | | | |
| P2 | [C] | [A] | [Z2] | | | |
| ... | ... | ... | ... | | | |

INFORMATION TRANSFER METHOD RADIO TERMINAL AND RADIO GATEWAY DEVICE USING DATALINK LAYER SIGNALING OF PROTOCOL INDENTIFIER

BACKGROUND OF THE INVENTION

1. Field of the Invention

The present invention relates to a radio terminal belonging to a radio network for carrying out communications by setting up logical channels on a radio network in advance and an information transfer method of a radio terminal, as well as to a radio gateway device for connecting an IEEE 1394 bus with a radio network for carrying out communications by setting up logical channels on a radio network in advance and an information transfer method of a radio gateway device.

2. Description of the Background Art

In recent years, the realization of home network is attracting much attention, and in particular, the IEEE 1394 bus for connecting between digital home electronic devices has been attracting considerable attention. The IEEE 1394 bus is capable of connecting a plurality of IEEE nodes in daisy chain or star connection and transferring a wideband data in excess of 100 Mbps. Also, it has a major feature that it is possible to transmit both asynchronous data and isochronous data on the same cable. For this reason, even though the IEEE 1394 bus was originally developed as a next generation version of SCSI, there are increasing trends to use the IEEE 1394 bus as a cable for connecting AV devices.

On the other hand, the realization of fast radio network (radio LAN) is also attracting attention. In particular, since the determination of the IEEE 802.11 specification in 1998, many radio LAN products are appearing in the market and there has been a remarkable decrease in the prices of these radio LAN products.

In conjunction with this trend for improved performance and reduced cost of the radio technology, there is an active trend to consider applications of the radio technology to the home environment and this trend is expected to grow further in future as can be anticipated by establishment of organizations of related companies such as HomeRF and Bluetooth (a kind of radio system using 2.4 GHz band) in the U.S.A. Also, from a viewpoint of the home network, the radio system is an easily acceptable system as it does not require any new cable construction. For this reason, a network system merging the IEEE 1394 bus and the fast and inexpensive radio LAN system is expected to play a central role in the future home network.

In such an environment for merging the IEEE 1394 bus and the radio network, there are several outstanding problems.

For example, one of the problems is how a protocol executed on the IEEE 1394 bus (a protocol presupposing the IEEE 1394 at the datalink layer such as AV/C protocol) can be executed over the radio network. In particular, in the case of executing a protocol such as the AV/C protocol in which message types (command, response, etc.) on the protocol are identified by logical addresses (registers) on the IEEE 1394 bus (where a value indicating an AV/C command or a value indicating an AV/C response can be found by reading a register according to an offset value described in a packet), identifiers corresponding to the logical addresses on that IEEE 1394 bus must also be provided at the radio LAN side. This situation is similar in the case of executing the AV/C protocol or the like between radio terminals.

SUMMARY OF THE INVENTION

It is therefore an object of the present invention to provide a radio terminal and its information transfer method which are capable of executing the AV control protocol by expanding it over to a radio network for executing data transfer after establishing a logical connection between radio terminals prior to data transfer between radio terminals.

It is another object of the present invention to provide a radio gateway device and its information transfer method which are capable of executing the AV control protocol by expanding it over to a radio network at a radio gateway for connecting the IEEE 1394 bus with a radio network for executing data transfer after establishing a logical connection between radio terminals prior to data transfer between radio terminals.

According to one aspect of the present invention there is provided an information transfer method for transferring information regarding an AV control protocol in a radio system for carrying out data transfer after establishing a logical connection between radio terminals or gateways prior to data transfer between radio terminals or gateways, the method comprising the steps of: exchanging signaling packets for signaling at a datalink layer between the radio terminals or gateways prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from each radio terminal or gateway indicates a channel identifier that is set up for the each radio terminal or gateway and a signaling packet received from a correspondent radio terminal or gateway indicates a channel identifier that is set up for the correspondent radio terminal or gateway; storing at the each radio terminal or gateway a correspondence information obtained through an exchange of the signaling packets, the correspondence information indicating a correspondence among the protocol identifier, the channel identifier that is set up for the each radio terminal or gateway, and the channel identifier that is set up for the correspondent radio terminal or gateway; and transferring the data packets between the radio terminals or gateways, according to the correspondence information.

According to another aspect of the present invention there is provided an information transfer method for transferring information regarding an AV control protocol at a radio gateway connecting an IEEE 1394 bus with a radio network for carrying out data transfer after establishing a logical connection between radio terminals or gateways prior to data transfer between radio terminals or gateways, the method comprising the steps of: exchanging signaling packets for signaling at a datalink layer with a correspondent radio terminal or gateway on the radio network prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio gateway indicates a channel identifier that is set up for the radio gateway and a signaling packet received from the correspondent radio terminal or gateway indicates a channel identifier that is set up for the correspondent radio terminal or gateway; storing a correspondence information obtained through an exchange of the signaling packets, the correspondence information indicating a correspondence among the protocol identifier, the channel identifier that is set up for the radio gateway, and the channel identifier that is set up for the correspondent radio terminal or gateway; and transferring the data packets from a radio network side to an IEEE 1394 bus side or from the IEEE 1394 bus side to the radio network side, according to the correspondence information.

According to another aspect of the present invention there is provided a radio terminal device in a radio system for carrying out data transfer after establishing a logical connection between radio terminals or gateways prior to data transfer between radio terminals or gateways, the radio terminal device comprising: a signaling packet exchange unit configured to exchange signaling packets for signaling at a datalink layer with a correspondent radio terminal or gateway prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio terminal device indicates a channel identifier that is set up for the radio terminal device and a signaling packet received from the correspondent radio terminal or gateway indicates a channel identifier that is set up for the correspondent radio terminal or gateway; a memory unit configured to store a correspondence information obtained through an exchange of the signaling packets, the correspondence information indicating a correspondence among the protocol identifier, the channel identifier that is set up for the radio terminal device, and the channel identifier that is set up for the correspondent radio terminal or gateway; and a data packet exchange unit configured to exchange the data packets with the correspondent radio terminal or gateway, according to the correspondence information.

According to another aspect of the present invention there is provided a radio gateway device connecting an IEEE 1394 bus with a radio network for carrying out data transfer after establishing a logical connection between radio terminals or gateways prior to data transfer between radio terminals or gateways, the radio gateway device comprising: a signaling packet exchange unit configured to exchange signaling packets for signaling at a datalink layer with a correspondent radio terminal or gateway on the radio network prior to an exchange of data packets on which information regarding an AV control protocol is loaded, each signaling packet containing a channel identifier indicating a logical channel that is set up for transferring the data packets and a protocol identifier indicating the AV control protocol, such that a signaling packet transmitted from the radio gateway device indicates a channel identifier that is set up for the radio gateway device and a signaling packet received from the correspondent radio terminal or gateway indicates a channel identifier that is set up for the correspondent radio terminal or gateway; a memory unit configured to store a correspondence information obtained through an exchange of the signaling packets, the correspondence information indicating a correspondence among the protocol identifier, the channel identifier that is set up for the radio gateway device, and the channel identifier that is set up for the correspondent radio terminal or gateway; and a data packet transfer unit configured to transfer the data packets from a radio network side to an IEEE 1394 bus side or from the IEEE 1394 bus side to the radio network side, according to the correspondence information.

According to another aspect of the present invention there is provided a computer usable medium having computer readable program codes embodied therein for causing a computer to function as a radio terminal device in a radio system for carrying out data transfer after establishing a logical connection between radio terminals or gateways prior to data transfer between radio terminals or gateways, the computer readable program codes include: a first computer readable program code for causing said computer to exchange signaling packets for signaling at a datalink layer with a correspondent radio terminal or gateway prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio terminal device indicates a channel identifier that is set up for the radio terminal device and a signaling packet received from the correspondent radio terminal or gateway indicates a channel identifier that is set up for the correspondent radio terminal or gateway; a second computer readable program code for causing said computer to store a correspondence information obtained through an exchange of the signaling packets, the correspondence information indicating a correspondence among the protocol identifier, the channel identifier that is set up for the radio terminal device, and the channel identifier that is set up for the correspondent radio terminal or gateway; and a third computer readable program code for causing said computer to exchange the data packets with the correspondent radio terminal or gateway, according to the correspondence information.

According to another aspect of the present invention there is provided a computer usable medium having computer readable program codes embodied therein for causing a computer to function as a radio gateway device connecting an IEEE 1394 bus with a radio network for carrying out data transfer after establishing a logical connection between radio terminals or gateways prior to data transfer between radio terminals or gateways, the computer readable program codes include: a first computer readable program code for causing said computer to exchange signaling packets at a datalink layer with a correspondent radio terminal or gateway on the radio network prior to an exchange of data packets on which information regarding an AV control protocol is loaded, each signaling packet containing a channel identifier indicating a logical channel that is set up for transferring the data packets and a protocol identifier indicating the AV control protocol, such that a signaling packet transmitted from the radio gateway device indicates a channel identifier that is set up for the radio gateway device and a signaling packet received from the correspondent radio terminal or gateway indicates a channel identifier that is set up for the correspondent radio terminal or gateway; a second computer readable program code for causing said computer to store a correspondence information obtained through an exchange of the signaling packets, the correspondence information indicating a correspondence among the protocol identifier, the channel identifier that is set up for the radio gateway device, and the channel identifier that is set up for the correspondent radio terminal or gateway; and a third computer readable program code for causing said computer to transfer the data packets from a radio network side to an IEEE 1394 bus side or from the IEEE 1394 bus side to the radio network side, according to the correspondence information.

Other features and advantages of the present invention will become apparent from the following description taken in conjunction with the accompanying drawings.

BRIEF DESCRIPTION OF THE DRAWINGS

FIG. 3 is a diagram showing exemplary correspondence tables to be used in the packet transfer between radio terminals in the radio network of FIG. 1.

FIG. 9 is a diagram showing exemplary correspondence tables to be used in the AV/C protocol execution in the radio network of FIG. 7.

FIG. 13 is a diagram showing exemplary correspondence tables to be used in the AV/C protocol execution in the radio network of FIG. 11.

DETAILED DESCRIPTION OF THE PREFERRED EMBODIMENTS

Figure 1:
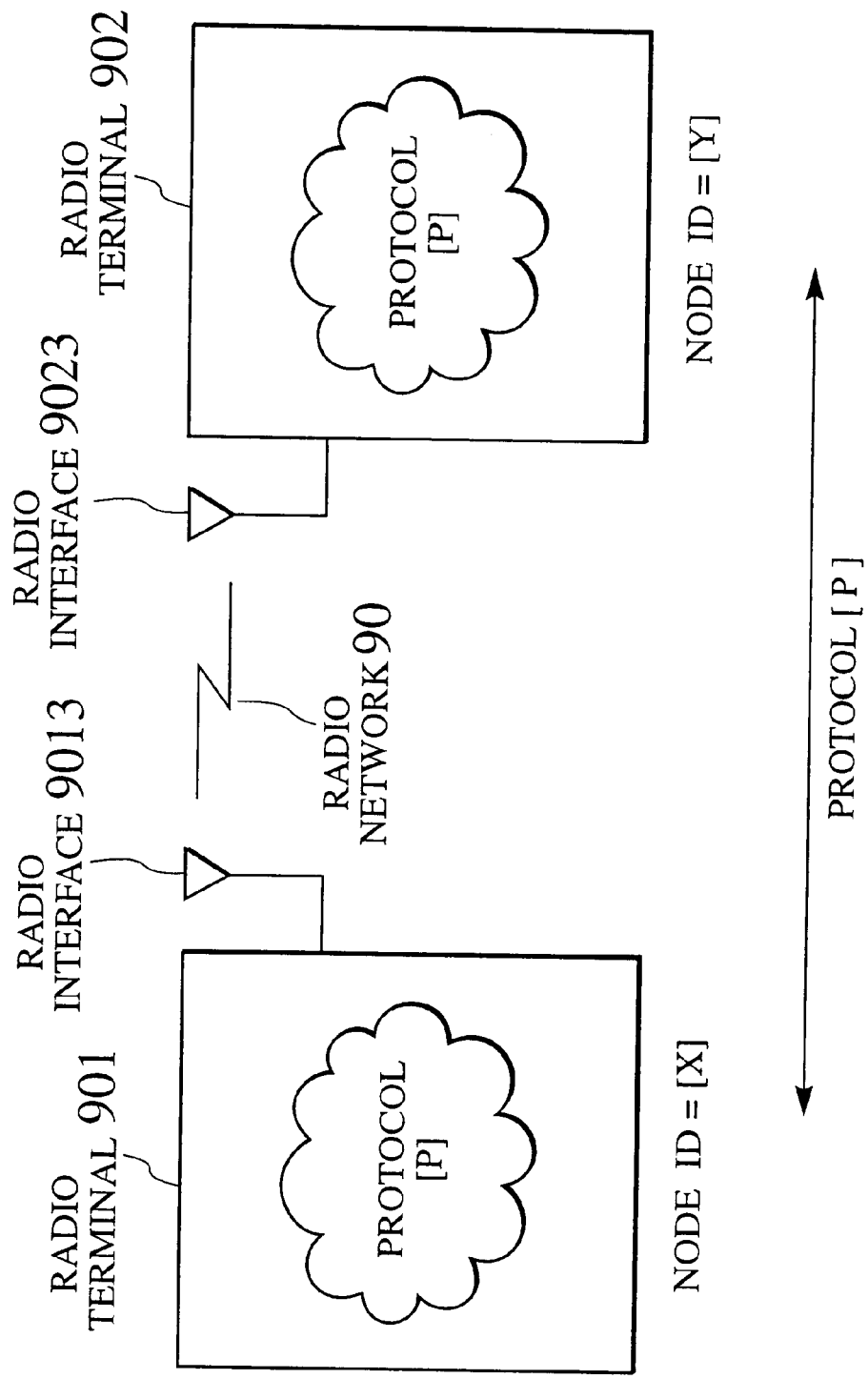
FIG. 1 is a schematic diagram showing an exemplary radio network according to the first embodiment of the present invention.

First, the main features of the present invention will be summarized briefly.

In the present invention, the protocol identifier of the AV control protocol is defined as a protocol identifier of a datalink layer packet in a radio system for executing data transfer after establishing a logical connection between radio terminals prior to data transfer between radio terminals. For example, the AV/C protocol is added as a protocol identifier of an L2CAP packet in the Bluetooth. In this case, the AV control protocol can be identified from the protocol identifier at the datalink layer (a message type in this AV control protocol can be identified from at an upper layer protocol).

Alternatively, the protocol identifier of the AV control protocol is defined as a protocol identifier of a datalink layer packet, for each message type separately. For example, the AV/C command of the AV/C and the AV/C response of the AV/C protocol are added as protocol identifiers of an L2CAP packet in the Bluetooth. In this case, the AV control protocol as well as the message type in this AV control protocol can be identified from the protocol identifier at the datalink layer.

Also, datalink layer signaling packet are exchanged between radio terminals, where the datalink layer signaling packet contains a channel identifier indicating a logical channel that is set up for the purpose of transferring a packet on which information regarding this AV control protocol is loaded and a protocol identifier indicating this AV control protocol, and each radio terminal stores a correspondence information among the protocol identifier, a channel identifier of a channel that is set up for the own terminal, and the a channel identifier of a channel that is set up for a correspondent radio terminal, which are obtained through the signaling packet exchange. Thereafter, the data packet on which information regarding this AV control protocol is loaded will be transferred by attaching the correspondent channel identifier, such that the receiving side can judge that the received packet is a packet regarding the AV control protocol, from the channel identifier attached to the received packet, at the datalink layer.

Also, in the present invention, the protocol identifier of the AV control protocol is defined as a protocol identifier of a datalink layer packet with respect to a radio network side, similarly as described above, at a radio gateway device for connecting the IEEE 1394 bus with a radio network for carrying out data transfer after establishing a logical connection between radio terminals prior to data transfer between radio terminals (such that the AV control protocol can be identified from a protocol identifier at a datalink layer). Also, an access (read/write) with respect to a specific register on the IEEE 1394 bus can be set in correspondence with a protocol identifier on the radio network (in the case of the AV/C protocol, a register offset value for an AV/C command and a register offset value for an AV/C response can be set in correspondence with the same protocol identifier).

Alternatively, similarly as described above, the protocol identifier of the AV control protocol is defined as a protocol identifier of a datalink layer packet, for each message type separately, with respect to a radio network side (such that the AV control protocol as well the message type in this AV control protocol can be identified from the protocol identifier at the datalink layer). Also, an access (read/write) with respect to a specific register on the IEEE 1394 bus can be set in correspondence with a protocol identifier on the radio network (in the case of the AV/C protocol, a register offset value for an AV/C command can be set in correspondence to a protocol identifier of the AV/C command, and a register offset value for an AV/C response can be set in correspondence with a protocol identifier of the AV/C response).

A radio network section between the radio gateway device and the radio terminal is the same as between radio terminals described above. Also, in the packet relay processing between the radio network and the IEEE 1394 bus at the radio gateway device, a correspondence information is set up in advance by carrying out the signaling with the radio terminal as described above, and at a time of transferring a packet from the radio network side to the IEEE 1394 bus side, the fact that it is an AV/C command or an AV/C response of the AV/C protocol is ascertained from the channel identifier (or the channel identifier and the upper layer processing) in the received packet, and a packet is transferred to the IEEE 1394 side by describing a corresponding register offset value therein. Also, at a time of transferring a packet from the IEEE 1394 bus side to the radio network side, the fact that it is an AV/C command or an AV/C response of the AV/C protocol is ascertained from the register offset value, and a packet is transferred to the radio network side by describing a correspondent channel identifier therein.

According to the present invention, even in the case of using a radio LAN system for carrying out data transfer after establishing a logical connection between radio terminals prior to data transfer between radio terminals, it is possible to execute a protocol such as AV/C protocol for which the protocol processing is to be carried out by using a combination of a command and a response as one set. Also, by assigning a channel identifier corresponding to a protocol to be executed in advance, it is possible to simplify the datalink layer processing on the radio terminal.

Also, according to the present invention, it is possible to execute the AV/C protocol on the datalink protocol which starts communications after setting up a logical channel on a radio network. It is also possible to execute the AV/C protocol across such a radio network and the IEEE 1394 bus. In particular, it is possible to realize the AV data transfer control processing across the IEEE 1394 and the Bluetooth which is a kind of radio system using 2.4 GHz band.

Thus, according to the present invention, it is possible to control a protocol that presupposes the IEEE 1394 such as AV/C protocol across the radio network and the IEEE 1394 bus.

First Embodiment

Referring now to FIG. 1 to FIG. 10, the first embodiment of the present invention will be described in detail.

The first embodiment is directed to the case where a radio LAN system is assumed to be a system for carrying out data transfer after establishing a logical connection between radio terminals prior to data transfer between radio terminals. For example, the Bluetooth can be used as such a radio LAN system.

Figure 2:
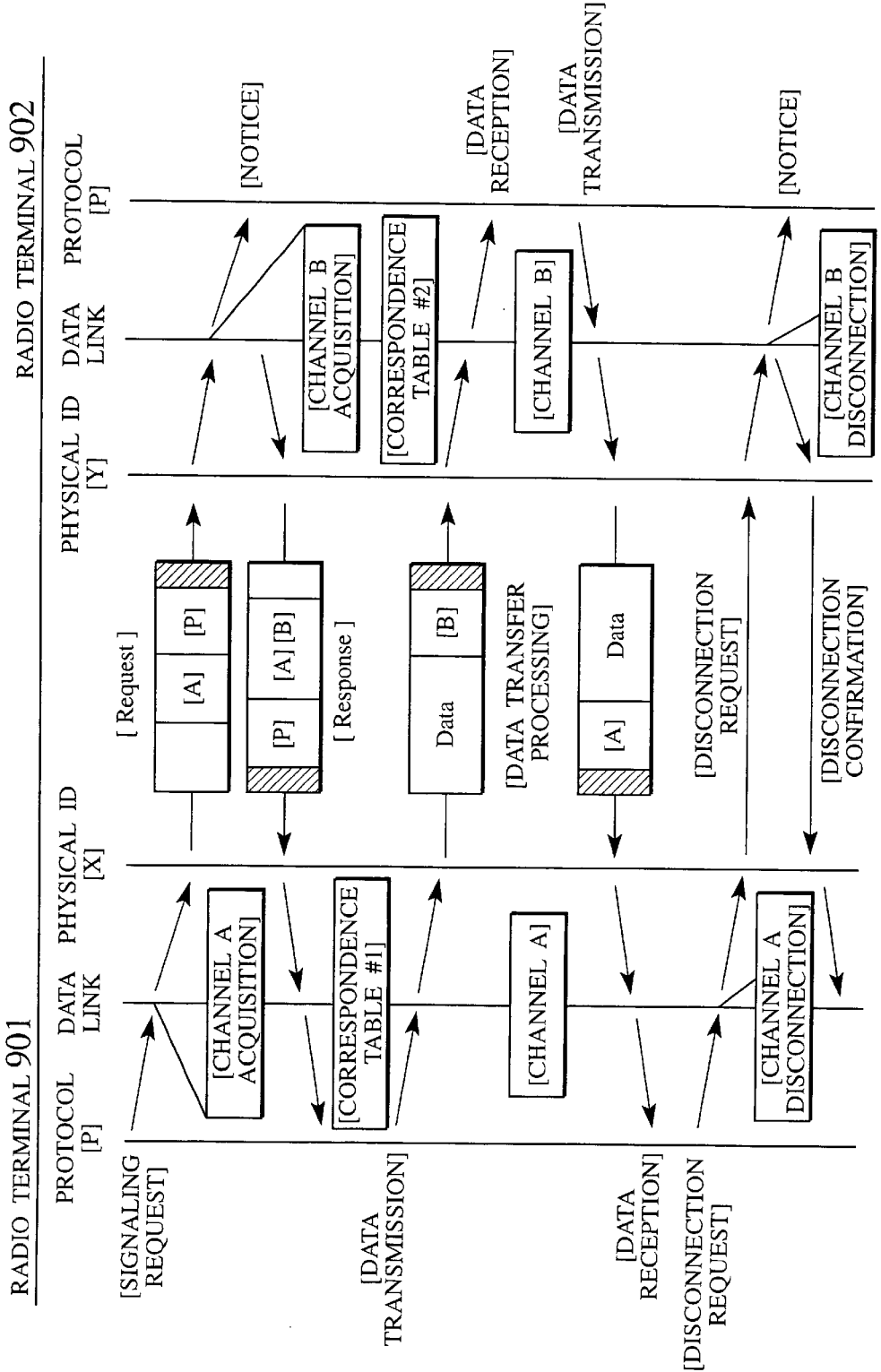
FIG. 2 is a sequence chart for a processing of a packet transfer between radio terminals in the radio network of FIG. 1.

FIG. 1 shows an exemplary basic configuration of a radio network in the first embodiment, and FIG. 2 shows an exemplary basic processing sequence in the case of carrying out packet transfer between radio terminals in the first embodiment. In the radio LAN system shown in FIG. 1, at a time of transferring data related to some protocol P between two radio terminals 901 and 902 that are connected to a radio network 90 through radio interfaces 9013 and 9023, the processing shown in FIG. 2 will be carried out. Note that, in FIG. 1, it is assumed that the radio terminal 901 has a node ID=[X] and the radio terminal 902 has a node ID=[Y].

The processing sequence of FIG. 2 is carried out as follows.

1: Signaling processing

First, prior to data transfer by the protocol P between the radio terminal 901 and the radio terminal 902, the signaling processing is carried out between the radio terminals 901 and 902, such that a channel identifier (abbreviated hereafter as channel ID) regarding a logical connection is acquired at a datalink layer in each one of the radio terminals 901 and 902 (here it is assumed that channel IDs A and B are respectively acquired in this example). Note that the acquired channel ID information is exchanged between the radio terminals by the signaling processing.

2: Data transfer processing

Next, the data transfer between the radio terminal 901 and the radio terminal 902 is carried out through the logical connection identified by the channel IDs (A, B) at the datalink layer in the radio terminals 901 and 902 that are established by the signaling processing (here it is assumed that the channel ID=B on the radio terminal 902 side will be used for the data transfer from the radio terminal 901 to the radio terminal 902, and the channel ID=A on the radio terminal 901 side will be used for the data transfer from the radio terminal 902 to the radio terminal 901 in this example).

3: Channel release processing

After that, when a prescribed condition is satisfied, this logical connection is disconnected, and the channel IDs (A, B) that have been acquired at the datalink layer in the radio terminals 901 and 902 will be released. The prescribed condition can be satisfied when it is requested from the radio terminal 901 as indicated in FIG. 2, or when a prescribed period of time has elapsed since that channel ID is acquired, or when a prescribed period of time has elapsed since the data communication related to that channel ID was carried out last, for example. The channel can also be disconnected when the power of the radio terminal is turned off, or when the battery remaining power becomes less than a prescribed threshold, for example (in other words, the channel may not be disconnected until the power is turned off, for example).

A part (a) of FIG. 3 shows an example of a correspondence table #1 to be created at the radio terminal 901 and a part (b) of FIG. 3 shows an example of a correspondence table #2 to be created at the radio terminal 902, in the signaling processing of the processing sequence of FIG. 2.

Each correspondence table has a format in which a protocol, a channel ID of the own terminal (own channel ID) for executing that protocol, a node ID of a correspondent terminal (correspondent node ID), and a channel ID of that correspondent terminal (correspondent channel ID) are stored in correspondence.

As a specific example in accordance with FIG. 1, the correspondence table #1 in the radio terminal 901 shown in a part (a) of FIG. 3 records a correspondence among the protocol="P", the own channel ID="A", the correspondent node ID="Y" (=the node ID of the radio terminal 902), and the correspondent channel ID="B". Similarly, the correspondence table #2 in the radio terminal 902 shown in a part (b) of FIG. 3 records a correspondence among the protocol= "P", the own channel ID="B", the correspondent node ID="X" (=the node ID of the radio terminal 901) and the correspondent channel ID="A".

Figure 4:
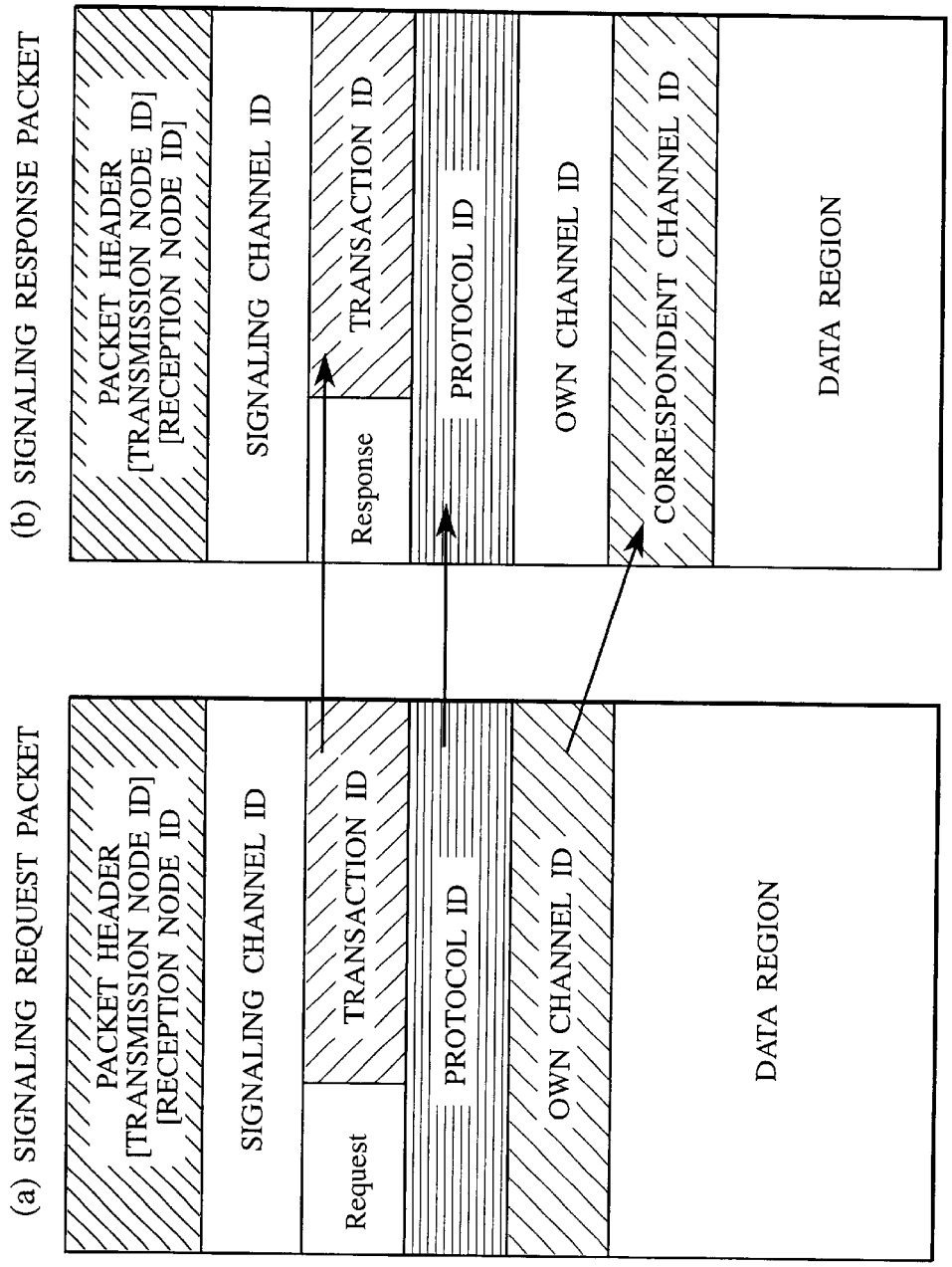
FIG. 4 is a diagram showing exemplary packet formats for a signaling request packet and a signaling response packet to be transferred between radio terminals in the radio network of FIG. 1.

A part (a) of FIG. 4 shows an exemplary packet format for a signaling request packet and a part (b) of FIG. 4 shows an exemplary packet format for a signaling response packet, which are to be used in the signaling processing in this radio LAN system.

In the example shown in FIG. 4, the signaling information to be transferred contains the own channel ID (in the case of the signaling request packet) or the own channel ID and the correspondent channel ID (in the case of the signaling response packet) as well as the protocol ID of a protocol to be executed from now on.

In this way, each one of the radio terminals 901 and 902 can maintain a correspondence between a newly acquired channel ID at the datalink layer and the upper layer protocol to be executed on the own terminal (by using that channel ID).

Figure 5:
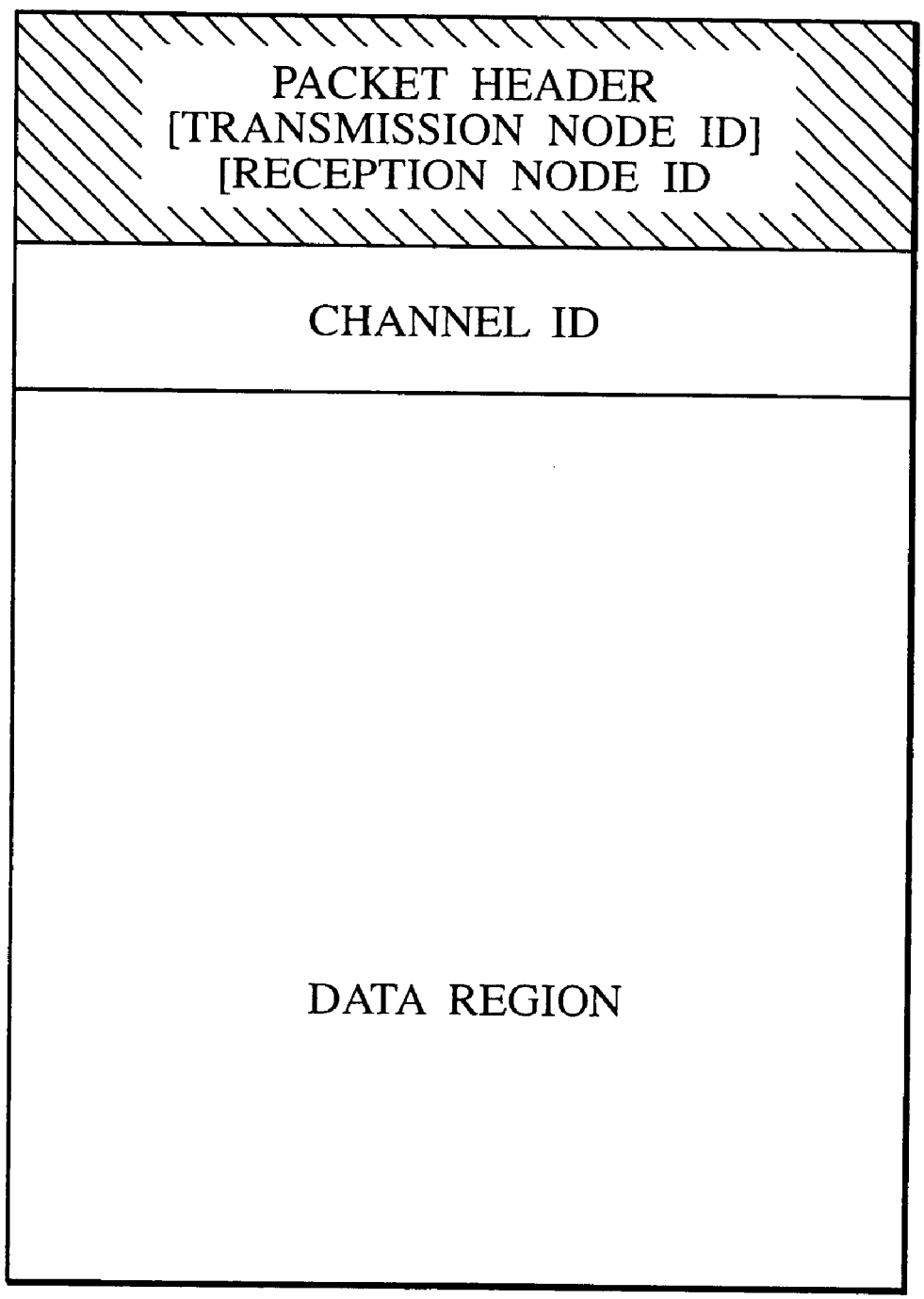
FIG. 5 is a diagram showing an exemplary packet format of a data packet to be transferred between radio terminals in the radio network of FIG. 1.

As the correspondence between the channel ID of the own terminal and the upper layer protocol can be maintained by the signaling processing, a packet to be used for the actual data transfer will not be attached with the upper layer protocol and it suffices to attach a value of the corresponding channel ID as shown in FIG. 5. Namely, the radio terminal on the transmitting side will transfer the packet by referring to the correspondence table in the own terminal and attaching a value of the channel ID on the correspondent terminal to which that upper layer protocol packet is to be transmitted (that is, the correspondent channel ID of the correspondence table shown in FIG. 3) to a header portion. Then, the radio terminal on the receiving side can ascertain even the upper layer protocol by referring to the correspondence table in the own terminal by using the channel ID attached to the packet as the own channel ID.

In this way, it is possible to improve the data transfer efficiency in the actual data transfer.

In the following, the case where the AV control protocol as defined by the IEEE 1394 is to be executed between radio terminals in the radio LAN system as described above, and the case where the AV control protocol is to be executed between a radio terminal on the radio LAN system as described above and a 1394 node on the IEEE 1394 bus will be described in detail.

Figure 6:
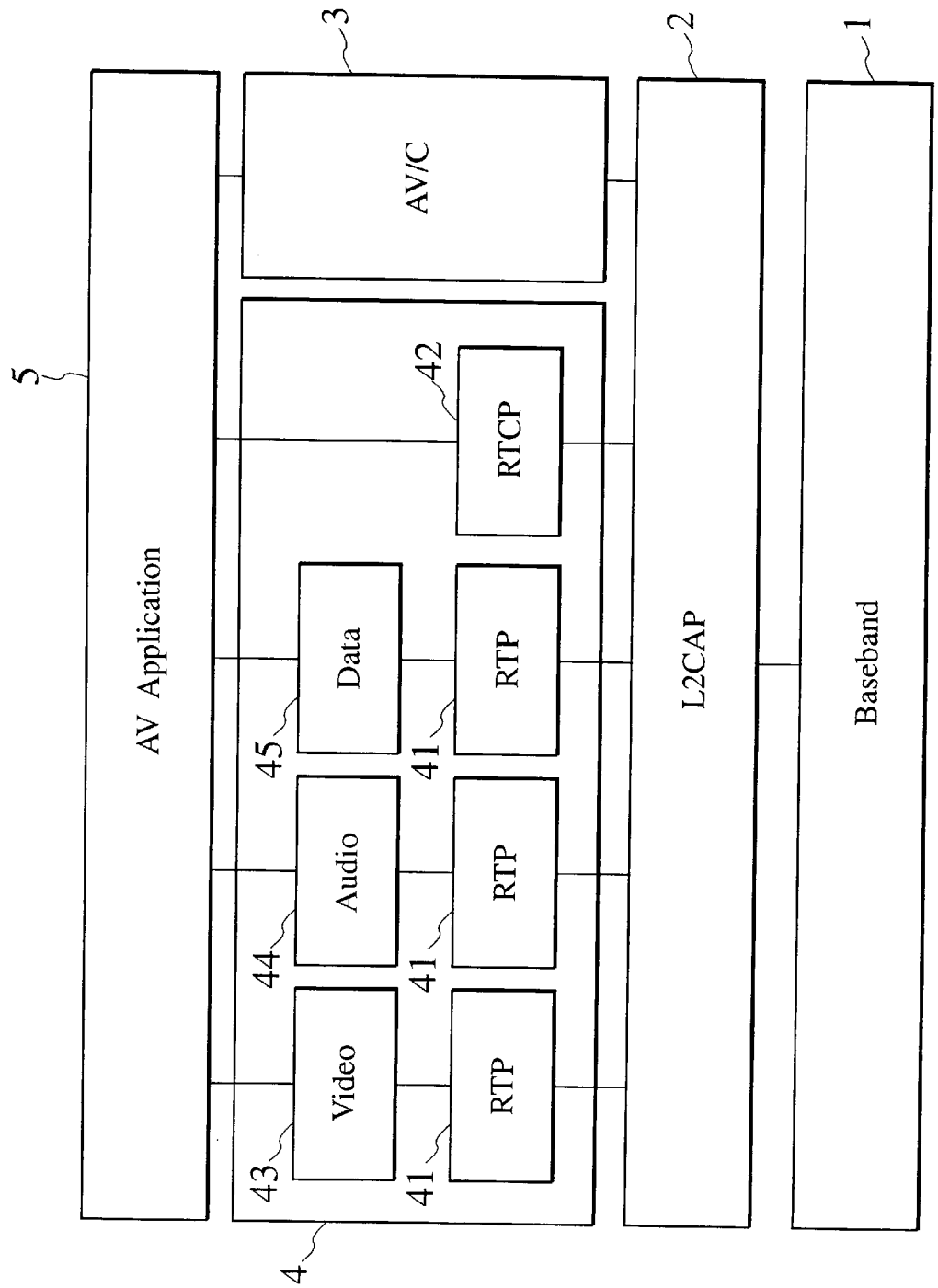
FIG. 6 is a diagram showing an exemplary protocol stack to be executed by a radio terminal according to the first embodiment of the present invention.

FIG. 6 shows an exemplary protocol stack for the AV data transfer scheme to be executed by the radio terminals in the following description.

The protocol stack of FIG. 6 is for the case of using the Bluetooth (in which a physical layer is Baseband and a datalink layer is L2CAP), that is currently under the process of standardization, as the radio system.

The protocol stack of FIG. 6 is also for the case of executing the AV/C protocol as defined by the IEEE 1394 as the AV control protocol for transferring AV data and thereby providing a function such as the so called session control processing, at a time of executing an AV application at the radio terminal.

Note that the AV/C protocol recognizes nodes in terms of Units, and constituent elements (such as Display or VTR, for example) within each node in terms of SubUnits. Also, in the protocol for transferring the AV/C control commands (commands such as "play", "stop", "fast forward", etc.), a transmission of a command and a reception of a response are to be carried out as one set.

In addition, in the protocol stack of FIG. 6, a group of protocols related to the actual AV data transfer are used (a block 4 of FIG. 6). For example, various data such as video data, audio data and information data can be transferred by respective RTP (Realtime Transport Protocol) packets, the RTP packets can be further encapsulated into L2CAP packets according to the datalink layer protocol of the Bluetooth, and the AV data transfer control information can be exchanged using the RTCP protocol (RTP Control Protocol), but the present invention is not necessarily limited to this case.

FIG. 6 shows an internal configuration regarding the protocol processing of the radio terminal, which includes processing units for executing respective protocols, i.e., a Baseband processing unit 1 for executing the physical layer processing of the Bluetooth, an L2CAP processing unit 2 for executing the datalink layer processing of the Bluetooth, an AV/C protocol processing unit 3 for executing the AV/C protocol at an upper layer of the L2CAP processing unit 2, an AV data transfer processing unit 4 for executing a group of protocols related to the actual AV data transfer (the AV data transfer processing unit 4 has RTP processing units 41 for executing the RTP protocol, and a Video processing unit 43, an Audio processing unit 44, and Data processing unit 45 provided at an upper layer of the RTP processing unit 41, and an RTCP processing unit 42 for executing the RTCP protocol, for example), and an AV application processing unit 5 for executing an AV application at an upper layer of the AV/C protocol processing unit 3 and the AV data transfer processing unit 4.

Note here that, a radio gateway device to be described in the second embodiment below will have a physical processing unit and a datalink layer processing unit of the IEEE 1394 bus, and a gateway function processing unit for enabling execution of the AV/C protocol across the radio network and the IEEE 1394, in addition to the configuration shown in FIG. 6. The gateway function processing unit executes a Proxy processing of the AV/C protocol, etc.

Note also that the above description is directed to an exemplary case of using the RTP protocol and the RTCP protocol as exemplary protocols for transferring AV data and their control information, but the present invention is also applicable to the case of using any other AV transfer protocol.

The present invention is also applicable to the case where the AV data are to be transferred by being multiplexed using H.223 protocol or the like.

First, the case of executing the AV control protocol as defined by the IEEE 1394 between radio terminals in the radio LAN system for carrying out data transfer after establishing a logical connection between radio terminals prior to data transfer between radio terminals will be described.

Here, an identifier for the AV/C protocol is defined as one of protocol identifiers (PSM (Protocol Service Multiplexor)) on the radio LAN, and the datalink layer protocol on the radio LAN carries out the packet transfer after setting up a logical connection at the datalink layer whenever a packet according to the AV/C protocol is to be transmitted. Also, whether it is an AV/C command or an AV/C response is identified at an upper layer (the AV/C protocol processing unit 3 of FIG. 6, for example) of the datalink layer rather than at the datalink layer.

Figure 7:
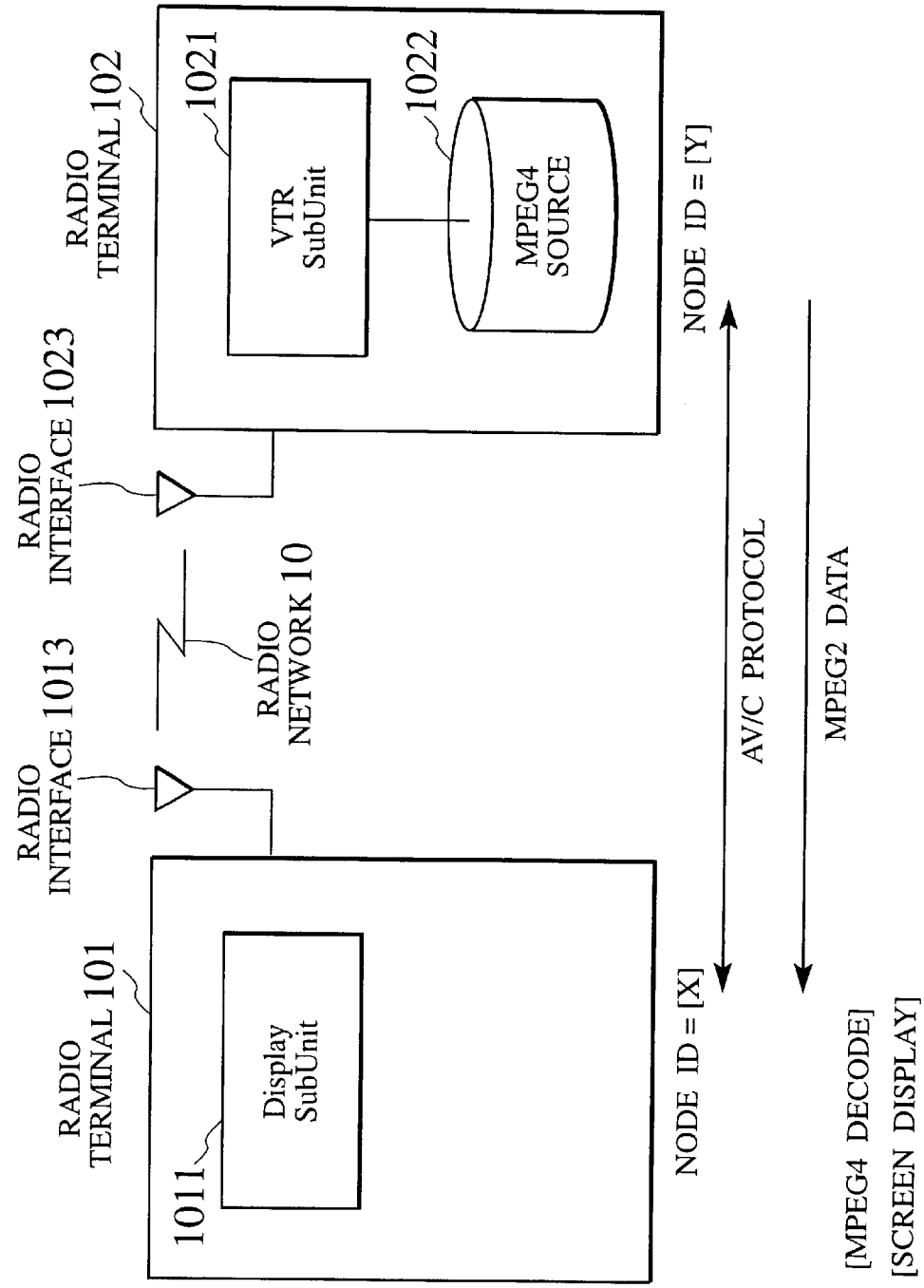
FIG. 7 is a schematic diagram showing an exemplary radio network for executing the AV/C protocol between radio terminals according to the first embodiment of the present invention.

FIG. 7 shows an exemplary configuration of a radio network in this case.

In FIG. 7, a radio terminal 101 and a radio terminal 102 are connected to a radio network 10 through radio interfaces 1013 and 1023, and FIG. 7 depicts the case where MPEG4 data in the radio terminal 102 are to be playbacked/viewed at the radio terminal 101 through this radio network 10.

FIG. 7 is also directed to the case of executing the AV/C protocol as defined by the IEEE 1394 as the AV control protocol for transmitting commands for the MPEG4 data transfer between the radio terminal 101 and the radio terminal 102.

In the AV/C protocol, functions (such as VTR function or Display function) within each terminal are to be recognized in terms of SubUnits, and a command is to be transmitted with respect to this SubUnit. In FIG. 7, a Display SubUnit 1011 as a function for playbacking/viewing the NPEG4 data is provided at the radio terminal 101, while a VTR SubUnit 1021 as a function for transmitting the MPEG4 data and a MEPG4 source 1022 as a function for storing the MPEG4 data are provided at the radio terminal 102 (here it is assumed that the MPEG4 source 1022 is regarded as being contained in the VTR SubUnit 1021 on the AV/C protocol).

In FIG. 7, it is assumed that the radio terminal 101 has a node ID=[X] and the radio terminal 102 has a node ID=[Y].

Figure 8:
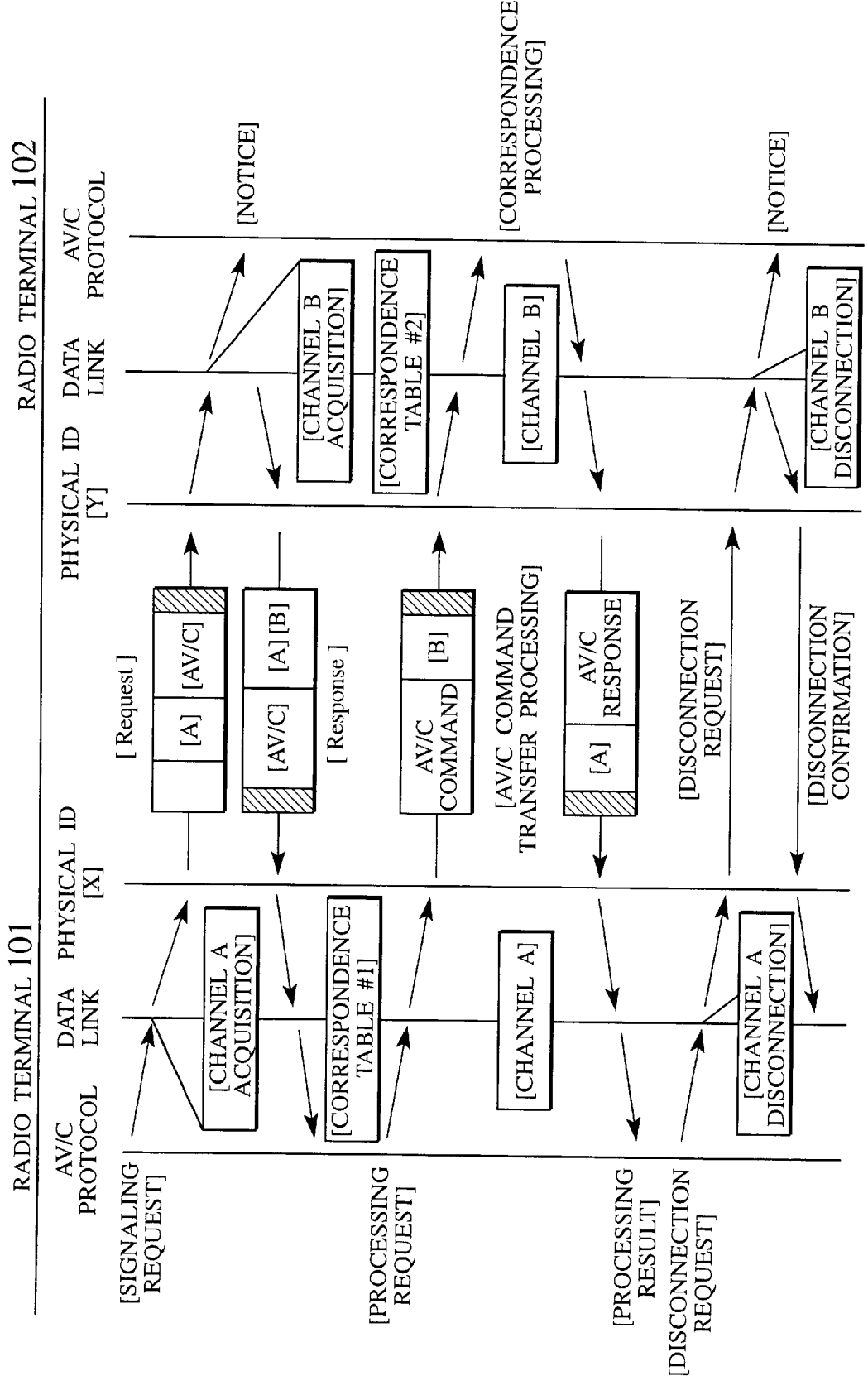
FIG. 8 is a sequence chart for one exemplary processing of AV/C protocol execution in the radio network of FIG. 7.

FIG. 8 shows an exemplary procedure for executing the AV/C protocol between the radio terminal 101 and the radio terminal 102 in this case.

In the AV/C protocol, a transfer of a command information and a transfer of a response information corresponding to that command are to be executed as one set. Consequently, in this embodiment, one logical channel (a channel ID at the datalink layer of each radio terminal) is assigned to each combination of a command and a response (one command processing set) in the case of executing the AV/C protocol between the radio terminal 101 and the radio terminal 102.

Also, FIG. 7 shows an exemplary case where there are only two radio terminals in the radio network 10, but in practice other radio terminals may also exist and the AV/C protocol may be executed between these other radio terminals. Consequently, in FIG. 8, the corresponding logical connection is disconnected immediately when the execution of the one command processing set is finished, such that the AV/C command and response to be received at respective radio terminals can easily identify the corresponding processing. Note that, as described above, there are various methods for controlling the disconnection of the logical connection, and it is even possible to use a method for not disconnecting the channel until the power is turned off.

In the following, the AV/C protocol processing sequence shown in FIG. 8 will be described.

(1: Signaling processing) A logical connection is established between the radio terminal 101 and the radio terminal 102.

At the radio terminal 101, the AV/C protocol with respect to the radio terminal 102 is activated, and a request for acquiring a logical connection for this AV/C command transfer (signaling request) is transferred to the datalink layer processing unit (the L2CAP processing unit 2 of FIG. 6, for example) within the own terminal.

After a channel (which is assumed to be "A"38 ) is acquired within the radio terminal 101, a request for acquiring a channel of the radio terminal 102 corresponding to the channel "A" is transferred to the radio terminal 102. A packet to be transferred here contains a description of a channel ID at the radio terminal 101 [A] and a protocol ID of the protocol to be executed [AV/C] entered by the datalink layer processing unit (see a part (a) of FIG. 4).

At the radio terminal 102 which received the above channel acquisition request, when the datalink processing unit recognizes that the above protocol ID described in the channel acquisition request indicates the AV/C protocol, a channel (which is assumed to be "B") is acquired as a channel for executing the AV/C protocol with the radio terminal 101. Also, this fact (the fact that the channel "A" is acquired at the radio terminal 101 side and the channel "B" is acquired at the radio terminal 102 side as the logical connection for the AV/C command transfer) is notified to the AV/C protocol processing unit (the AV/C protocol processing unit 3 of FIG. 6, for example) on the own terminal.

A channel acquisition response (signaling response) indicating that the channel [B] is assigned in response to a request from the channel [A] on the radio terminal 101 is transmitted from the radio terminal 102 to the radio terminal 101. A packet to be transferred here contains a description of the channel ID at the radio terminal 101 [A], the corresponding channel ID at the radio terminal 102 [B], and the protocol ID of the protocol to be executed [AV/C] entered by the datalink layer processing unit (see a part (b) of FIG. 4). Also, this fact (the fact that the channel "A" is acquired at the radio terminal 101 side and the channel "B" is acquired at the radio terminal 102 side as the logical connection for the AV/C command transfer) is notified to the AV/C protocol processing unit.

Note that, when the channel [B] is acquired, the correspondence table #2 storing the correspondence of the channels is created at the radio terminal 102 (see a part (b) of FIG. 9).

At the radio terminal 101 which received the above channel acquisition response, the fact that the channel ID [B] is acquired in the radio terminal 102 in correspondence to the channel ID [A] acquired in the own terminal in order to execute the AV/C protocol is recognized by referring to the above identification information described in the channel acquisition response.

Note that, at this point, the correspondence table #1 storing the correspondence of the channels is created at the radio terminal 101 (see a part (a) of FIG. 9).

A part (a) of FIG. 9 shows an example of the correspondence table #1 to be maintained at the radio terminal 101 and a part (b) of FIG. 9 shows an example of the correspondence table #2 to be maintained at the radio terminal 102 in the series of processing described above.

Each correspondence table shown in FIG. 9 registers the AV/C protocol as the protocol executed at each radio terminal, and in correspondence to that, a channel ID at the datalink layer of the own terminal ([A] in the correspondence table #1, [B] in the correspondence table #2), a node ID of the correspondent radio terminal which is executing this protocol, and a channel ID at the datalink layer of that correspondent radio terminal ([B] in the correspondence table #1, [A] in the correspondence table #2) are stored. Using such a correspondence table, it is possible to identify a value of the destination channel ID of a transmission packet in the AV/C response transmission processing or a protocol of a transfer target of a received packet in the reception processing.

(2: Data transfer processing) An AV/C command is transmitted from the radio terminal 101.

A desired AV/C command is transmitted from the radio terminal 101 toward the radio terminal 102. Namely, at the datalink layer processing unit which received the AV/C command from the AV/C protocol processing unit on the own terminal, this AV/C command is transmitted to the radio terminal 102 by attaching the correspondent channel ID (="B") obtained by referring to the above described correspondence table #1 (AV/C command transmission processing). A packet to be transferred at this point contains a description of the channel ID on the radio terminal 102 [B] as an information on a destination of this packet, but a description of the own channel ID [A] and the protocol ID of the protocol [AV/C] are not contained (see FIG. 5).

At the radio terminal 102 which received the above packet (on which the AV/C command is loaded), when it is recognized that data in this packet is related to the AV/C protocol by referring to the above described correspondence table #2 by using the channel ID (="B") described in the packet as the own channel ID, this data (the AV/C command in this case) is given to the AV/C protocol processing unit on the own terminal and the processing corresponding to this data (AV/C command) is carried out at the AV/C protocol processing unit, and an AV/C response containing a result of the processing which is produced at the AV/C protocol processing unit is transmitted to the radio terminal 101 by attaching the correspondent channel ID (="A") obtained by referring to the above described correspondence table #2 (AV/C response transmission processing). A packet to be transferred at this point contains a description of the channel ID on the radio terminal 101 [A] as an information on a destination of this packet (but a description of the own channel ID [B] and the protocol ID of the protocol [AV/C] are not contained).

Similarly, at the radio terminal 101 which received the above packet (on which the AV/C command is loaded), when it is recognized that data in this packet is related to the AV/C protocol by referring to the above described correspondence table #1 by using the channel ID (="A") described in the packet as the own channel ID, this data (the AV/C response in this case) is given to the AV/C protocol processing unit on the own terminal (and the necessary processing is carried out at the AV/C protocol processing unit).

(3: Channel release processing) The radio terminal 101 which received the AV/C response as described above recognizes that the series of AV/C command transfer processing is finished, and requests a disconnection of the logical connection utilized.

The radio terminal 101 disconnects the channel "A" in the own terminal, and a request for disconnecting the channel "B" in the radio terminal 102 corresponding to the channel "A" is transmitted to the radio terminal 102.

The radio terminal 102 disconnects the channel "B" in the own terminal, and transmits a disconnection processing confirmation message to the radio terminal 101.

Note that, in this example, the portion related to the AV/C protocol on the correspondence table in each of the radio terminals 101 and 102 is deleted when the processing for transferring the AV/C command and the AV/C response is finished and the channel on the datalink layer of each radio terminal is disconnected (of course, various methods are possible here as described above).

Thereafter, the exchange of one set of an AV/C command and an AV/C response as described above is carried out according to the need.

Note that, when a playback request command (Play command) is transmitted and received as the above described AV/C command, for example, the AV data transfer by the RTP protocol or the like will be carried out.

It is also possible to use a method in which the channel ID for the AV/C protocol is assigned in advance, instead of acquiring the channel at a time of the individual AV/C command transmission processing as shown in FIG. 8.

Figure 10:
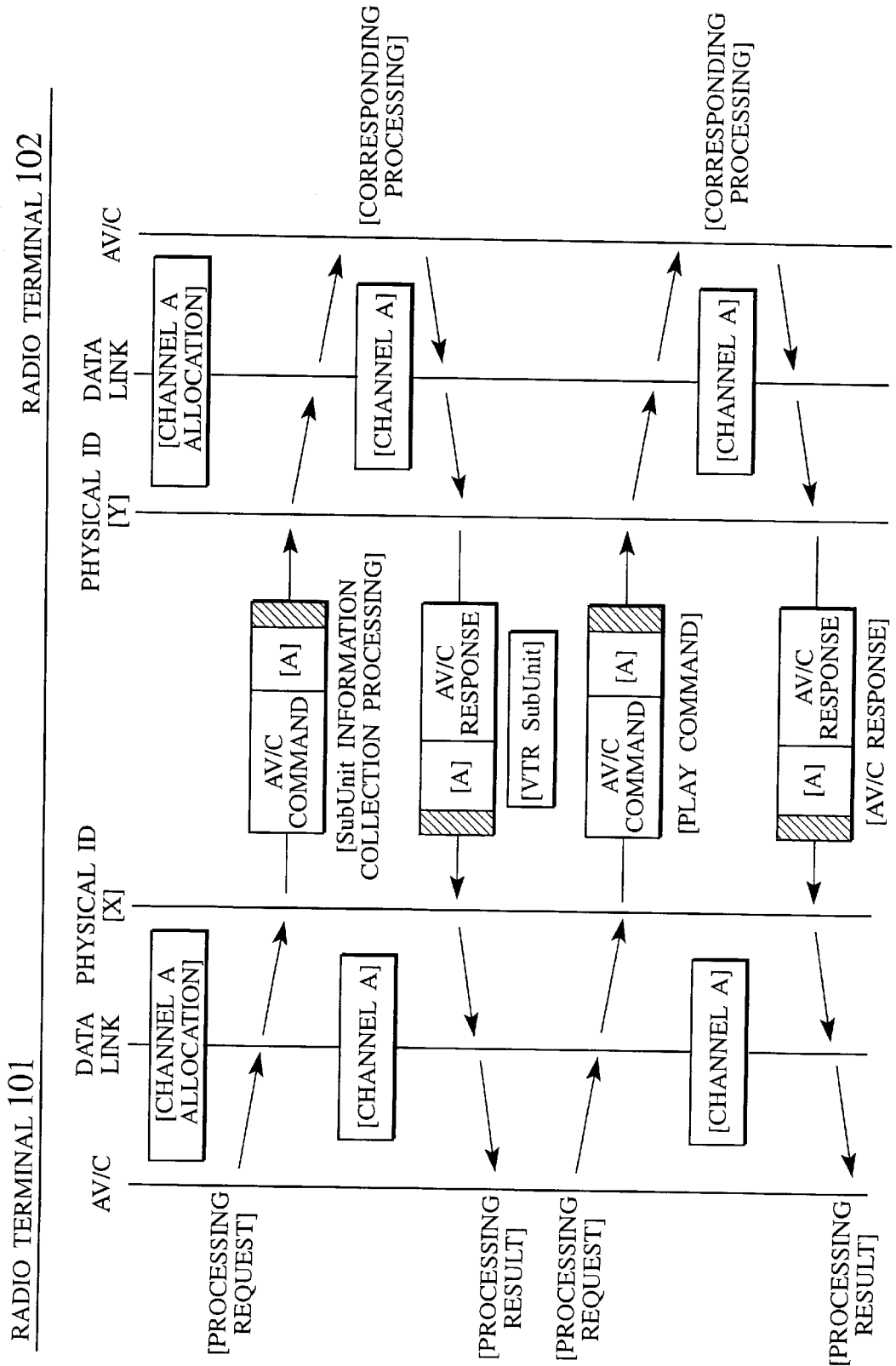
FIG. 10 is a sequence chart for another exemplary processing of AV/C protocol execution in the radio network of FIG. 7.

FIG. 10 shows an exemplary AV/C command transfer processing sequence in this case.

In FIG. 10, the channel (which is assumed to be "A") for the AV/C protocol is assigned in advance at the radio terminal 101 and the radio terminal 102, and data for which a transmission request is made from the AV/C protocol processing unit (the AV/C protocol processing unit 3 of FIG. 6, for example) on each radio terminal will be always transmitted with a description of [A] as a value of its transfer target channel ID. Also, when a packet of the channel [A] is received at each radio terminal, data in this received packet will be always transferred to the AV/C protocol processing unit at the upper layer. By assigning the channel ID for the AV/C protocol in advance in this way, the datalink layer processing can be simplified. However, in this case, the AV/C protocol processing unit on each radio terminal should carry out a processing for identifying an AV/C command transmitted by the own terminal which corresponds to the received AV/C response.

As described, according to the first embodiment, even in the case of using a radio LAN system for carrying out data transfer after establishing a logical connection between radio terminals prior to data transfer between radio terminals, it is possible to execute a protocol such as AV/C protocol for which the protocol processing is to be carried out by using a combination of a command and a response as one set. Also, by assigning a channel ID corresponding to a protocol to be executed in advance, it is possible to simplify the datalink layer processing on the radio terminal.

Second Embodiment

Referring now to FIG. 11 to FIG. 14, the second embodiment of the present invention will be described in detail.

The second embodiment is directed to the case where the AV control protocol is to be executed between a radio terminal on the radio LAN system as described above and a 1394 node on the IEEE 1394 bus, in a system merging the IEEE 1394 bus with the radio LAN system for carrying out data transfer after establishing a logical connection between radio terminals prior to data transfer between radio terminals.

Here, again, an identifier for the AV/C protocol is defined as one of protocol identifiers (PSM (Protocol Service Multiplexor)) on the radio LAN, and the datalink layer protocol on the radio LAN carries out the packet transfer after setting up a logical connection at the datalink layer whenever a packet according to the AV/C protocol is to be transmitted. Also, whether it is an AV/C command or an AV/C response is identified at an upper layer (the AV/C protocol processing unit 3 of FIG. 6, for example) of the datalink layer rather than at the datalink layer.

Figure 11:
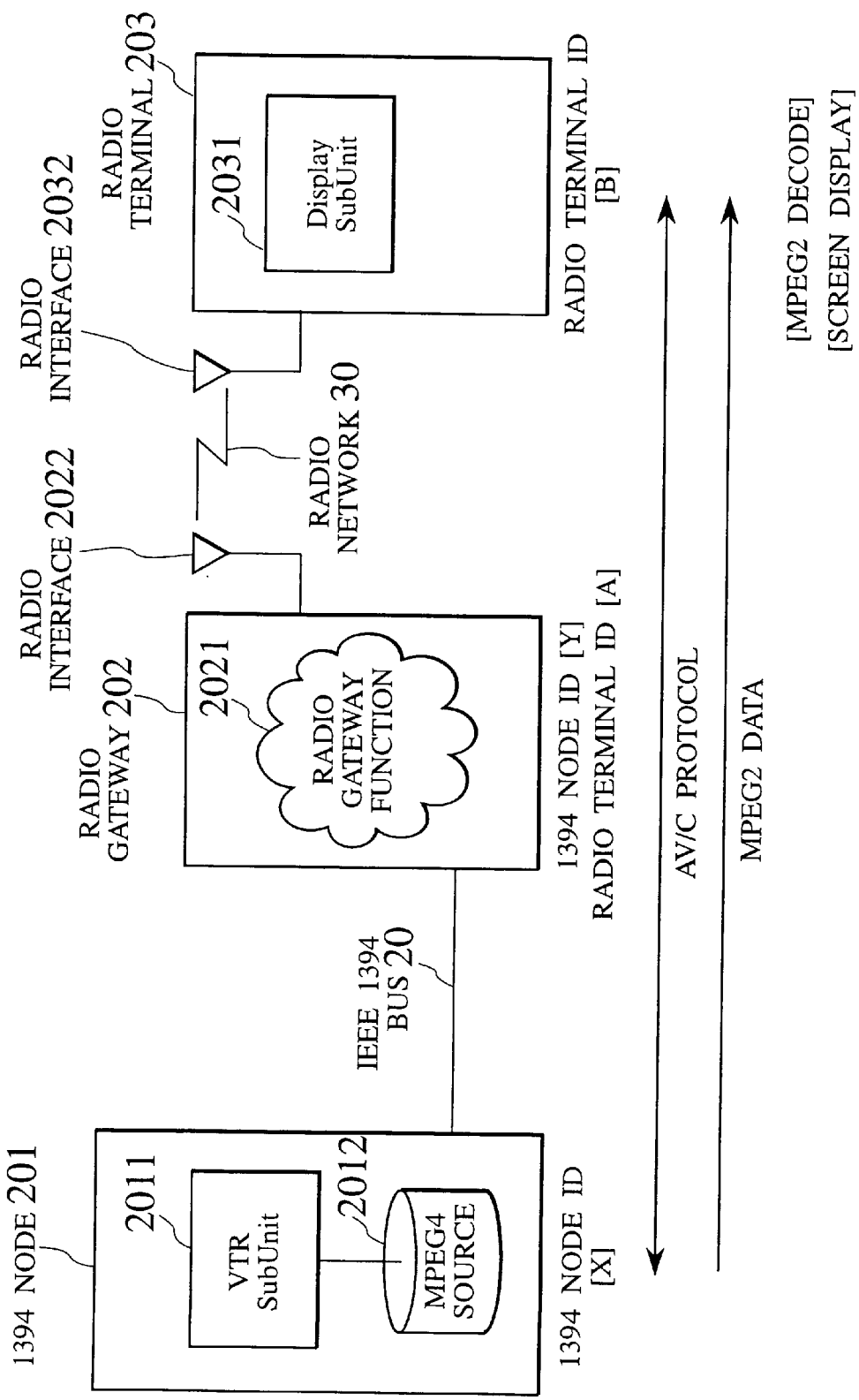
FIG. 11 is a schematic diagram showing an exemplary radio network for executing the AV/C protocol between a radio terminal and an IEEE 1394 node via a radio gateway according to the second embodiment of the present invention.

FIG. 11 shows an exemplary configuration of a radio network in this case.

In FIG. 11, a radio network 30 similar to that of FIG. 7 and an IEEE 1394 bus 20 are connected by a radio gateway 202, and a 1394 node 201 and a radio terminal 203 are provided on the IEEE 1394 bus 20 and the radio network 30 respectively (the radio terminal 203 and the radio gateway 202 are connected to the radio network 30 through radio interfaces 2022 and 2032, while the radio gateway 202 and the 1394 node 201 are connected to the IEEE 1394 bus 20). FIG. 11 depicts the case where MPEG2 data in the 1394 node 201 are to be playbacked/viewed at the radio terminal 203 through the IEEE 1394 bus 20, the radio gateway 202 and the radio network 30.

FIG. 11 is also directed to the case of executing the AV/C protocol as defined by the IEEE 1394 as the AV control protocol for transmitting commands for the MPEG2 data transfer between the radio terminal 203 and the 1394 node 201.

In FIG. 11, a Display SubUnit 2031 as a function for playbacking/viewing the MPEG2 data is provided at the radio terminal 203, while a VTR SubUnit 2011 as a function for transmitting the MPEG2 data and an MPEG2 source 2012 as a function for storing the MPEG2 data are provided at the 1394 node 201 (here it is assumed that the MPEG2 source 2012 is regarded as being contained in the VTR SubUnit 2011 on the AV/C protocol).

In FIG. 11, it is assumed that the 1394 node 201 and the radio gateway 202 have node IDs (1394 node IDs) [X] and [Y] on the IEEE 1394 bus 20 respectively, while the radio gateway 202 and the radio terminal 203 have node IDs (terminal IDs) [A] and [B] on the radio network 30 respectively.

Here, the radio gateway 202 that connects the radio network 30 and the IEEE 1394 bus 20 is providing the Proxy function for connecting the radio network 30 and the IEEE 1394 bus 20 at a layer of the AV/C protocol. More specifically, (the radio gateway function 2021 of) the radio gateway 202 makes the VTR SubUnit 2011 that actually exists in the 1394 node 201 to appear as if it is existing in the radio gateway 202 with respect to the radio terminal 203. In other words, the radio terminal 203 recognizes the VTR SubUnit 2011 as existing in the radio gateway 202. By carrying out such a Proxy processing, it becomes possible for the radio terminal 203 to execute the AV/C protocol with the 1394 bode 201 on the IEEE 1394 bus 20 by simply executing the AV/C protocol as defined on the radio network 30, without becoming conscious of the network configuration (the fact that the radio network 30 is actually operating by being connected to the IEEE 1394 bus 20).

Also, when a packet (which is assumed to be the AV/C command or the AV/C response) is received from the radio terminal 203, the radio gateway 202 can recognize this packet as a packet according to the AV/C protocol at the datalink layer, from the protocol identifier on the radio LAN contained in the header. Then, whether this packet is the AV/C command or the AV/C response can be ascertained at the upper layer. At a time of transmitting this AV/C command or AV/C response to the 1394 node 201, a register offset value corresponding to the AV/C command or AV/C response is described in the header of the packet.

When a packet (which is assumed to be the AV/C command or the AV/C response) is received from the 1394 node 201, the radio gateway 202 can recognize this packet as a packet of the AV/C command or the AV/C response according to the AV/C protocol by reading a corresponding portion of the register according to the register offset value in the header. At a time of transmitting this AV/C command or AV/C response to the radio terminal 203, the protocol identifier on the radio LAN that corresponds to the AV/C protocol is described in the header of the packet.

Now, the case where the MPEG2 data existing on the 1394 node 201 are to be playbacked/viewed at the radio terminal 203 in the configuration as described above will be described.

Figure 12:
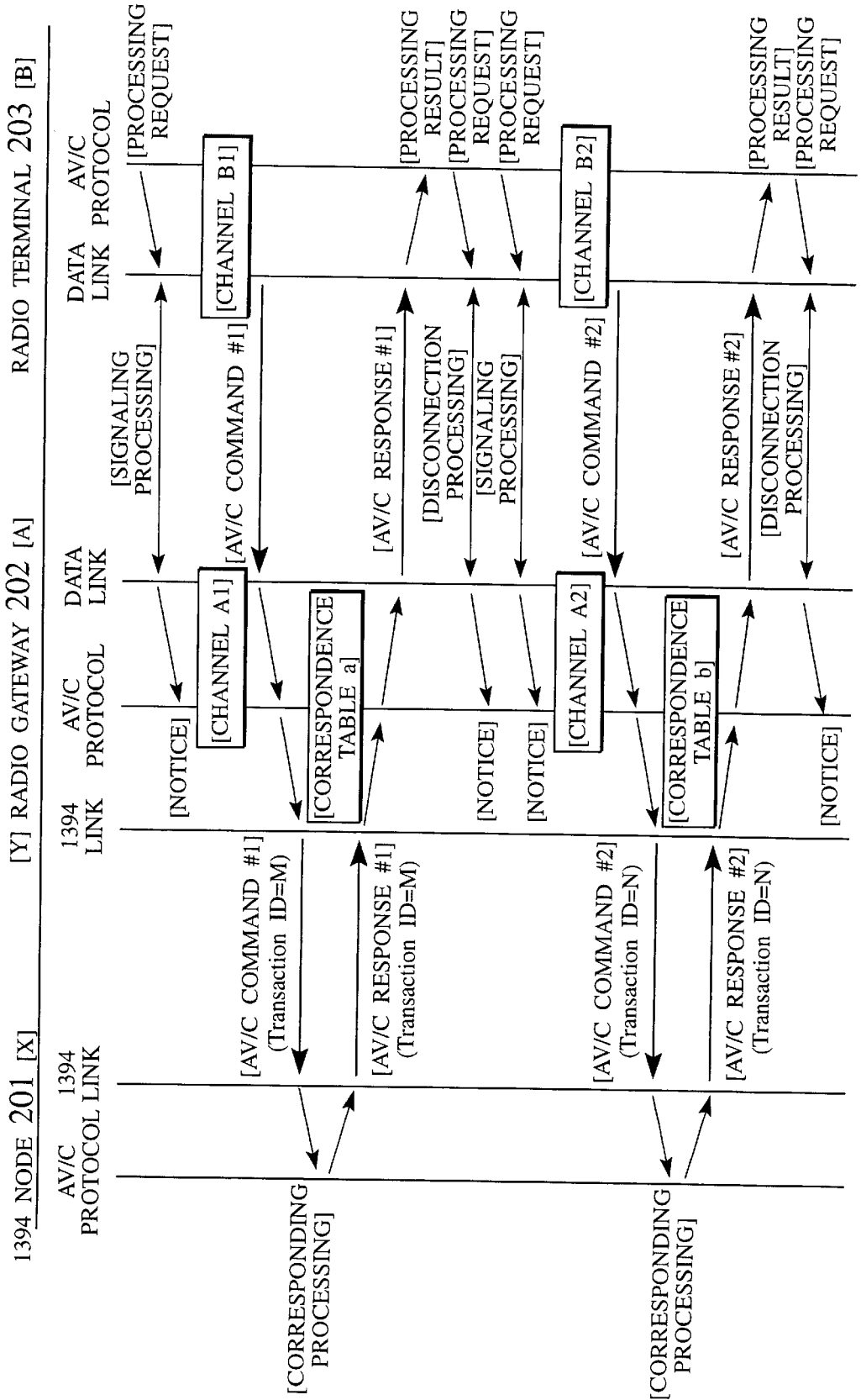
FIG. 12 is a sequence chart for one exemplary processing of AV/C protocol execution in the radio network of FIG. 11.

FIG. 12 shows an exemplary processing sequence in the case where this radio terminal 203 operates as a control node in the AV/C protocol to transmit a command to the 1394 node 201 and request transmission of the MPEG2 data on the 1394 node 201.

Note that, in FIG. 2, a part of the signaling processing between the radio terminal 203 and the radio gateway 202 is omitted but this signaling processing is similar to the signaling processing between the radio terminal 101 and the radio terminal 102 in FIG. 8. The fact that the AV/C command and the AV/C response are to be executed as one set is also similar to FIG. 8. The disconnection of the logical connection is also similar to FIG. 8.

In the processing of FIG. 12, in order to request the MPEG2 data transfer, the radio terminal 203 first transmits a command (SubUnit_info) for collecting the SubUnit information on the 1394 node 201, and then according to a result of that, the radio terminal 203 transmits a command (Play) for requesting the data transmission with respect to the VTR SubUnit 2011 on the 1394 node 201. FIG. 12 shows an exemplary case where, at times of transmitting these two AV/C commands (SubUnit_info, Play), the data transfer is carried out after acquiring a logical channel on the datalink layer at each radio terminal (a channel is disconnected when the AV/C command transmission and the AV/C response reception are completed).

Note that the operation of the radio terminal 203 and a format of the correspondence table to be created by the radio terminal 203 are basically similar to those of the radio terminal 101 of the first embodiment, and the operation of the radio gateway 202 regarding the radio network section is basically similar to that of the radio terminal 102 of the first embodiment.

Also, in this example, the logical channel acquired for the purpose of the AV/C command transmission is to be disconnected every time the AV/C command transmission and the AV/C response reception are completed (of course, various methods are possible here as described above).

First, the exchange of the AV/C command and the AV/C response for the purpose of obtaining the SubUnit information is carried out.

(1) A logical connection between the radio terminal 203 and the radio gateway 202 is established by the method similar to that of FIG. 8. Here it is assumed that a channel [B1] is assigned at the radio terminal 203 and a channel [A1] is assigned at the radio gateway 202 as a result of this.

(2) The radio terminal 203 transmits the SubUnit_info command for collecting the SubUnit information within the radio gateway 202, to the radio gateway 202. At this point, the logical channel [A1] on the radio network acquired by the previous processing is utilized.

(3) When the radio gateway 202 that received a packet of this SubUnit_info command recognizes that this packet is related to the AV/C protocol from the channel ID [A1] attached to this packet and that it is the AV/C command at the upper layer, the radio gateway 202 transfers the SubUnit_info command to the 1394 node 201 in order to notify not only the SubUnit information within the own terminal but also the SubUnit information within the 1394 node on the IEEE 1394 bus that is connected with the radio gateway 202 (at this point, the register offset value is set to be a value corresponding to the AV/C command and a transaction ID is attached).

At the radio gateway 202, a relationship between the logical channel [A1] on the radio network and the transaction ID (=M in FIG. 12) on the IEEE 1394 bus to which the AV/C command is to be transferred is stored into the correspondence table at a time of transferring the AV/C command to the 1394 node 201 (see a part (a) of FIG. 13).

The AV/C command is transferred from the radio gateway 202 to the 1394 node 201, and a processing corresponding to that is carried out at the 1394 node 201.

After the 1394 node 201 carried out the processing corresponding to the transmitted AV/C command (collecting the SubUnit information within the own terminal and creating a packet), the processing result is transferred to the radio gateway 202 as the AV/C response. At this point, a value of the transaction ID of the AV/C response on the IEEE 1394 bus is M.

(4) The radio gateway 202 that received a packet of this AV/C response recognizes that this packet is the AV/C response by referring to the register according to the register offset value attached to this packet, and ascertains that this AV/C response corresponds to the AV/C command (SubUnit_info command) transmitted earlier from the information of the correspondence table because the transaction ID attached to this packet is equal to M.

(5) The radio gateway 202 recognizes that the transfer target of this AV/C response is the radio terminal 203 (logical channel [B1]) from the information of the correspondence table, and transfers this AV/C response to the radio terminal 203 through that logical channel [B1] (which contains the SubUnit information within the own terminal and the collected SubUnit information within the 1394 node on the IEEE 1394 bus).

(6) When the radio terminal 203 that received a packet of this AV/C response recognizes that data in this packet is related to the AV/C protocol by referring to the correspondence table by using the channel ID (=B1) described in the packet as the own channel ID, this data (which is the AV/C response in this case) is given to the AV/C protocol processing unit on the own terminal (the fact that this data is the AV/C response is ascertained at the AV/C protocol processing unit). At the AV/C protocol processing unit, the SubUnit information inside the radio gateway 202 (which actually contains the SubUnit information within the 1394 node 201) can be collected according to this AV/C response. At this point, the radio terminal 203 disconnects the logical channel [B1] acquired for the purpose of the AV/C command transmission by regarding that a desired processing is finished for the time being.

(7) According to a request for disconnecting the logical channel [A1] from the radio terminal 203, the radio gateway 202 disconnects the logical channel [A1] and deletes the corresponding information from the correspondence table.

This completes the exchange of one set of the AV/C command and the AV/C response.

Next, the exchange of the AV/C command the AV/C response regarding the data transmission request is carried out.

(8) The radio terminal 203 establishes the logical connection between the radio terminal 203 and the radio gateway 202 by the method similar to that of FIG. 8, prior to transmission of a next AV/C command (Play command, for example). Here it is assumed that a channel [B2] is assigned at the radio terminal 203 and a channel [A2] is assigned at the radio gateway 202 as a result.

(9) Thereafter the transfer processing for the AV/C command and the transfer processing for the AV/C response are carried out by referring to the correspondence table (see a part (b) of FIG. 13) at the radio gateway 202, the transfer processing for the AV/C command (which is the Play command here) from the radio terminal 203 to the 1394 node 201 is carried out, the corresponding processing is carried out at the 1394 node 201, a response to the Play command is transferred from the 1394 node 201 to the radio terminal 203, and the disconnection processing for the logical channel is carried out, by the method similar to that described above.

This completes the exchange of a next one set of the AV/C command and the AV/C response.

Thereafter, the exchange of one set of an AV/C command and an AV/C response as described above is carried out according to the need.

Note that, when a playback request command (Play command) is transmitted and received as the above described AV/C command, for example, the AV data transfer by the RTP protocol or the like will be carried out.

FIG. 13 shows an example of the correspondence tables to be maintained at the radio gateway 202 in the series of processing described above, where a part (a) of FIG. 13 shows an example of the correspondence table "a" to be used in the processing related to the SubUnit_info command and its response in FIG. 12, and a part (b) of FIG. 13 shows an example of the correspondence table "b" to be used in the processing related to the Play command and its response in FIG. 12.

Each correspondence table shown in FIG. 13 registers the AV/C protocol as the protocol executed at each radio terminal, and in correspondence to that, an own radio channel ID indicating a channel ID at the datalink layer of the own terminal ([A1] in the correspondence table "a", [A2] in the correspondence table "b"), a correspondent terminal ID (=[B]) indicating a node ID of the correspondent radio terminal (203) which is executing this protocol, and a correspondent radio channel ID indicating a channel ID at the datalink layer of that correspondent radio terminal (203) ([B1] in the correspondence table a [B2] in the correspondence table "b") are stored. In addition, each correspondence table also registers a value of a transaction ID on the IEEE 1394 bus ("M" in the correspondence table "a", and "N" in the correspondence table "b"), the own 1394 node ID (=[Y]) indicating a node ID of this radio gateway 202 on the IEEE 1394 bus, and a correspondent 1394 node ID (=[X]) indicating a node ID of the correspondent 1394 node (201), for the purpose of transferring these AV/C command and response on the IEEE 1394 bus.

Using such correspondence tables, it is possible to carry out the transmission processing for the AV/C command and the AV/C response across the IEEE 1394 bus and the radio network.

Note that FIG. 13 shows the case where each correspondence table maintains parameters as described above, but parameters to be maintained in the correspondence table may also include a value of SubUnit_ID which is a transfer target of the AV/C command or a type of the AV/C command. For example, when there is an information with a description that it is a Notify command which is one type of the AV/C command, this information may be maintained without deleting it even when a corresponding AV/C response is received, because it can be expected that a response corresponding to a subsequent state change of the 1394 node will be returned.

Here, similarly as in the case of FIG. 10 with respect to the case of FIG. 8, it is also possible to use a method in which the logical channel ID for the AV/C protocol is assigned in advance, instead of acquiring the logical channel on the datalink layer at a time of each AV/C command transmission processing as shown in FIG. 12.

Figure 14:
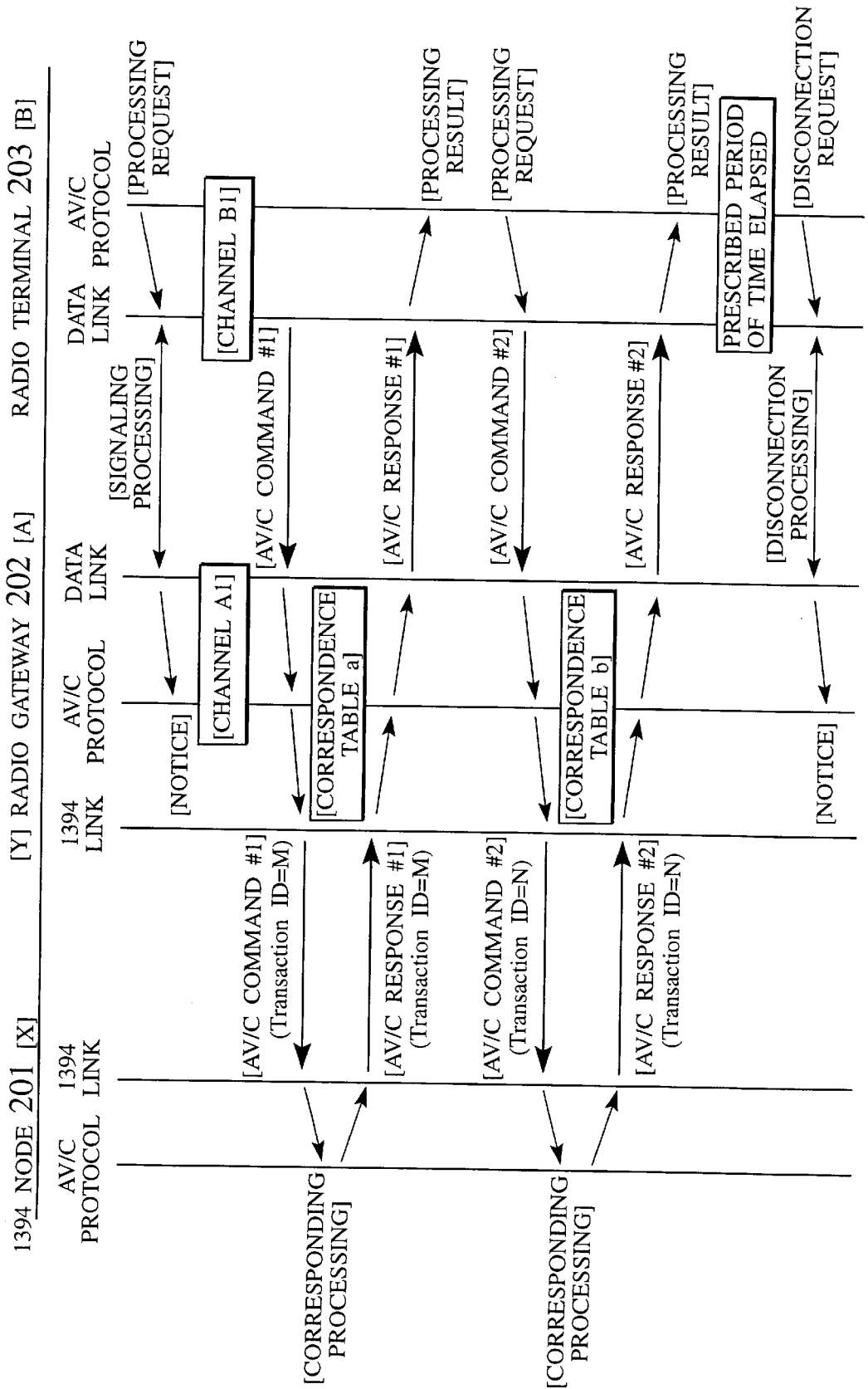
FIG. 14 is a sequence chart for another exemplary processing of AV/C protocol execution in the radio network of FIG. 11.

FIG. 14 shows an exemplary AV/C command transfer processing sequence in this case.

In FIG. 14, a logical channel [B1] on the radio terminal 203 and a logical channel [A1] on the radio gateway 202 are assigned in advance, as logical channels for executing the AV/C protocol, between the radio terminal 203 and the radio gateway 202, and the AV/C command for which a request for transmission to the radio gateway 202 is made from the AV/C protocol processing unit (the AV/C protocol processing unit 3 of FIG. 6, for example) on the radio terminal 203 will be always transmitted with a description of [A1] as a value of its transfer target logical channel ID. Also, the AV/C response will be always transmitted with a description of [B1] as a value of its transfer target logical channel ID. Also, when a packet of the logical channel [A1] is received at the radio gateway 202, data in this received packet will be always transferred to the AV/C protocol processing unit at the upper layer, or to a processing unit for transfer to the 1394 node on the IEEE 1394 bus.

By assigning the logical channel ID for the AV/C protocol in advance in this way, the datalink layer processing can be simplified.

Note that the exemplary network configuration of FIG. 11 is directed to the exemplary case where the radio terminal is a data receiving side and the 1394 node is a data transmitting side, but the case where the radio terminal is a transmitting side and the 1394 node is a receiving side is also possible similarly.

Also, the exemplary network configuration of FIG. 11 is directed to the exemplary case where there is only one radio gateway, but the case of carrying out data transfer between a first 1394 node connected to a first radio gateway via a first IEEE 1394 bus and a second 1394 node connected to a second radio gateway via a second IEEE 1394 bus is also possible similarly. Also, the case of carrying out data transfer between a first radio terminal connected to a first radio gateway via radio and a second radio terminal connected to a second radio gateway via radio where the first radio gateway and the second radio gateway are connected via an IEEE 1394 bus is also possible similarly.

Now, the AV/C protocol on the IEEE 1394 bus requires a description of a register offset value in the packet header in order to identify the AV/C protocol (in practice, different offset values are used for the AV/C command and the AV/C response). In contrast, in the first and second embodiments described above, in order to identify the AV/C protocol in a radio LAN system for carrying out data transfer after establishing a logical connection between radio terminals prior to data transfer between radio terminal, a protocol identifier on the radio LAN which indicates the AV/C protocol is defined and this protocol identifier indicating the AV/C protocol is to be described in the packet header at a time of transmitting a packet according to the AV/C protocol, and a command and a response are distinguished at the upper layer. However, it is also possible to distinguish a command and a response at the radio datalink layer as well.

To this end, it suffices to separately define a protocol identifier indicating the AV/C command and a protocol identifier indicating the AV/C response as protocol identifiers on the radio LAN. In this case, different logical connections, i.e., different channel identifiers, will be used for the AV/C command and the AV/C response.

Moreover, it is also possible to separately define protocol identifiers for the AV/C command in a direction from the first radio terminal to the second radio terminal, the AV/C response in a direction from the first radio terminal to the second radio terminal, the AV/C command in a direction from the second radio terminal to the first radio terminal, and the AV/C response in a direction from the second radio terminal to the first radio terminal, as protocol identifiers on the radio LAN. In this case, different logical connections, i.e., different channel identifiers, will be used for these four types of the protocol identifiers.

As described, according to the first and second embodiments, even in the case of using a radio LAN system for carrying out data transfer after establishing a logical connection between radio terminals prior to data transfer between radio terminals, it is possible to execute a protocol such as AV/C protocol for which the protocol processing is to be carried out by using a combination of a command and a response as one set. Also, by assigning a channel ID corresponding to a protocol to be executed in advance, it is possible to simplify the datalink layer processing on the radio terminal.

Also, according to the first and second embodiments, it becomes possible to realize the AV data transfer control processing across the radio network as described above and control a protocol that presupposes the IEEE 1394 such as AV/C protocol across the radio network and the IEEE 1394 bus.

It is to be noted that, in each embodiment described above, the channel identifier for the AV/C protocol (or for each one of the AV/C command and the AV/C response) is acquired (set up) at a time of signaling in the radio system, but it is also possible to acquire one or a plurality of channel identifiers in advance for the AV/C protocol (or for each one of the AV/C command and the AV/C response) (in the case where a plurality of channel identifiers are acquired, the radio terminal can suitably select and use a channel identifier that is available at that moment).

Also, in the above described embodiments, the channel identifier for the AV/C protocol (or for each one of the AV/C command and the AV/C response) is appropriately assigned at each radio terminal, but it is also possible to define a plurality of channel identifiers available for the AV/C protocol (or for each one of the AV/C command and the AV/C response) with respect to all terminals (in which case the radio terminal can suitably select and use a channel identifier from these plurality of channel identifiers).

It is also possible to define a unique channel identifier for the AV/C protocol with respect to all terminals in advance. It is also possible to define a unique channel identifier for the AV/C command with respect to all terminals in advance, while defining a unique channel identifier for the AV/C response with respect to all terminals in advance.

Also, the above described embodiments are directed to the exemplary case where the radio terminal of an AV data receiving side transmits a signaling request (at a time of issuing a playback request of the AV/C protocol, for example) and in response to this the radio terminal of an AV data transmitting side transmits a signaling response, but the case where the radio terminal of an AV data transmitting side transmits a signaling request (at a time of issuing a reception request of the AV/C protocol, for example) and in response to this the radio terminal of an AV data receiving side transmits a signaling response is also possible similarly.

Also, the above described embodiments are directed to the exemplary case of using the Bluetooth, but the present invention is also applicable to radio terminals of any other radio LAN system for carrying out data transfer after establishing a logical connection between radio terminals prior to data transfer between radio terminals.

Also, the above described embodiments are directed to the exemplary case of using the AV/C protocol as the AV control protocol for the AV data transfer, but the present invention is also applicable to the case of using any other AV control protocol.

Also, the present invention is equally applicable to a home network and a network provided in an office or any other environment.

Figure 15:
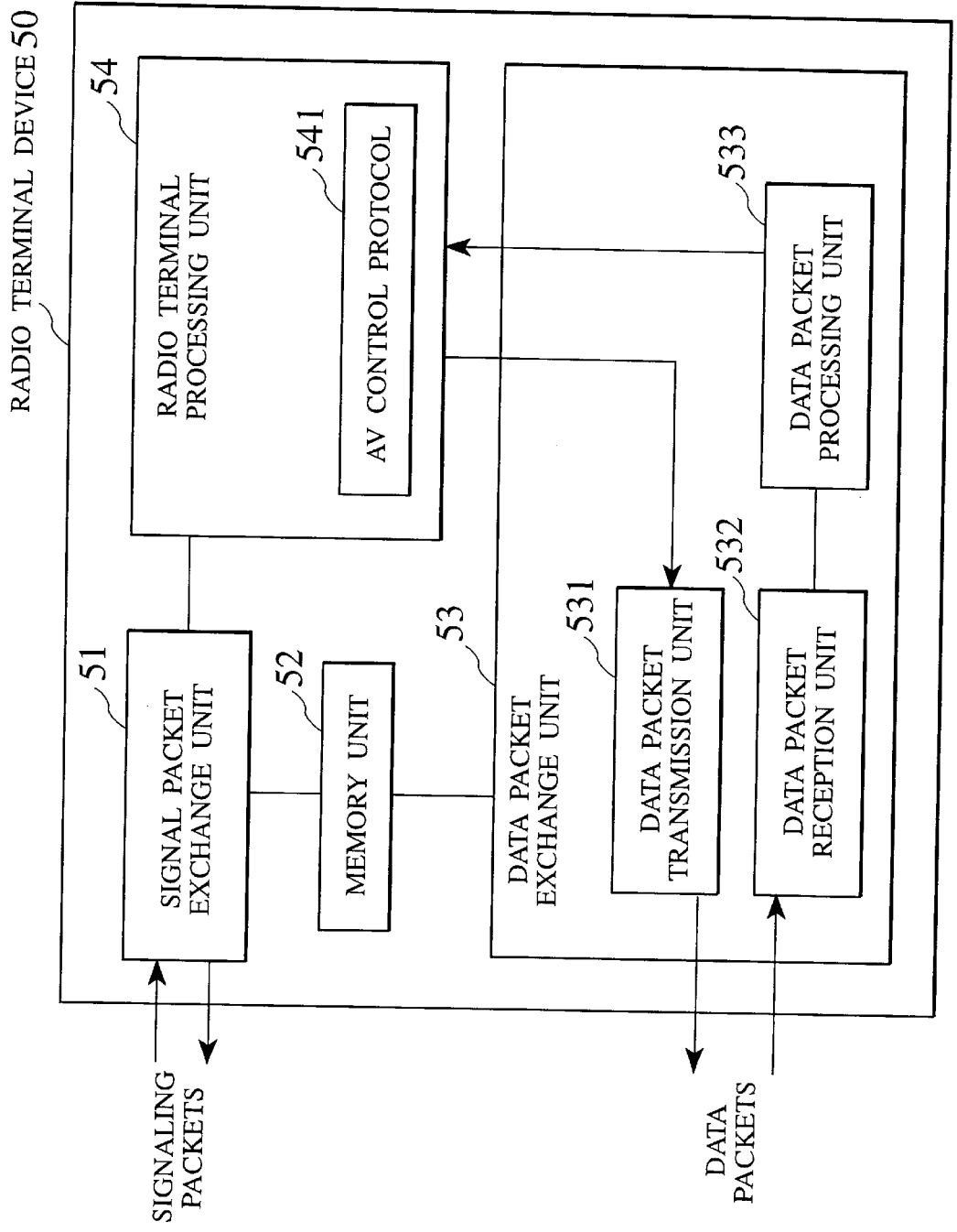
FIG. 15 is a block diagram showing an exemplary configuration of a radio terminal device according to the present invention.

It is to be noted that each radio terminal in the above described embodiments can be realized by a radio terminal device 50 as shown in FIG. 15, for use in a radio system for carrying out data transfer after establishing a logical connection between radio terminals or gateways prior to data transfer between radio terminals or gateways.

This radio terminal device 50 of FIG. 15 comprises: a signaling packet exchange unit 51 for exchanging signaling packets at a datalink layer with a correspondent radio terminal or gateway prior to an exchange of data packets on which the information regarding the AV control protocol is loaded, where each signaling packet contains a channel identifier indicating a logical channel that is set up for transferring the data packets and a protocol identifier indicating the AV control protocol; a memory unit 52 for storing a correspondence information among the protocol identifier, the channel identifier that is set up for the radio terminal device, and the channel identifier that is set up for the correspondent radio terminal or gateway, which are obtained through an exchange of the signaling packets; a data packet exchange unit 53 for exchanging the data packets with the correspondent radio terminal or gateway, according to the correspondence information; and a radio terminal processing unit 54 for carrying out the processing of the radio terminal.

The data packet exchange unit 53 includes a data packet transmission unit 531 for transmitting an outgoing data packet by attaching the channel identifier that is set up for the correspondent radio terminal or gateway and that is obtained by referring to the correspondence information; a data packet reception unit 532 for receiving an incoming data packet from the correspondent radio terminal or gateway; and a data packet processing unit 533 for giving the information regarding the AV control protocol as contained in the incoming data packet to the AV control protocol, when the incoming data packet is judged as a packet regarding the AV control protocol by referring to the correspondence information according to the channel identifier as described in the incoming data packet, The AV control protocol 541 is provided in the radio terminal processing unit 54.

Figure 16:
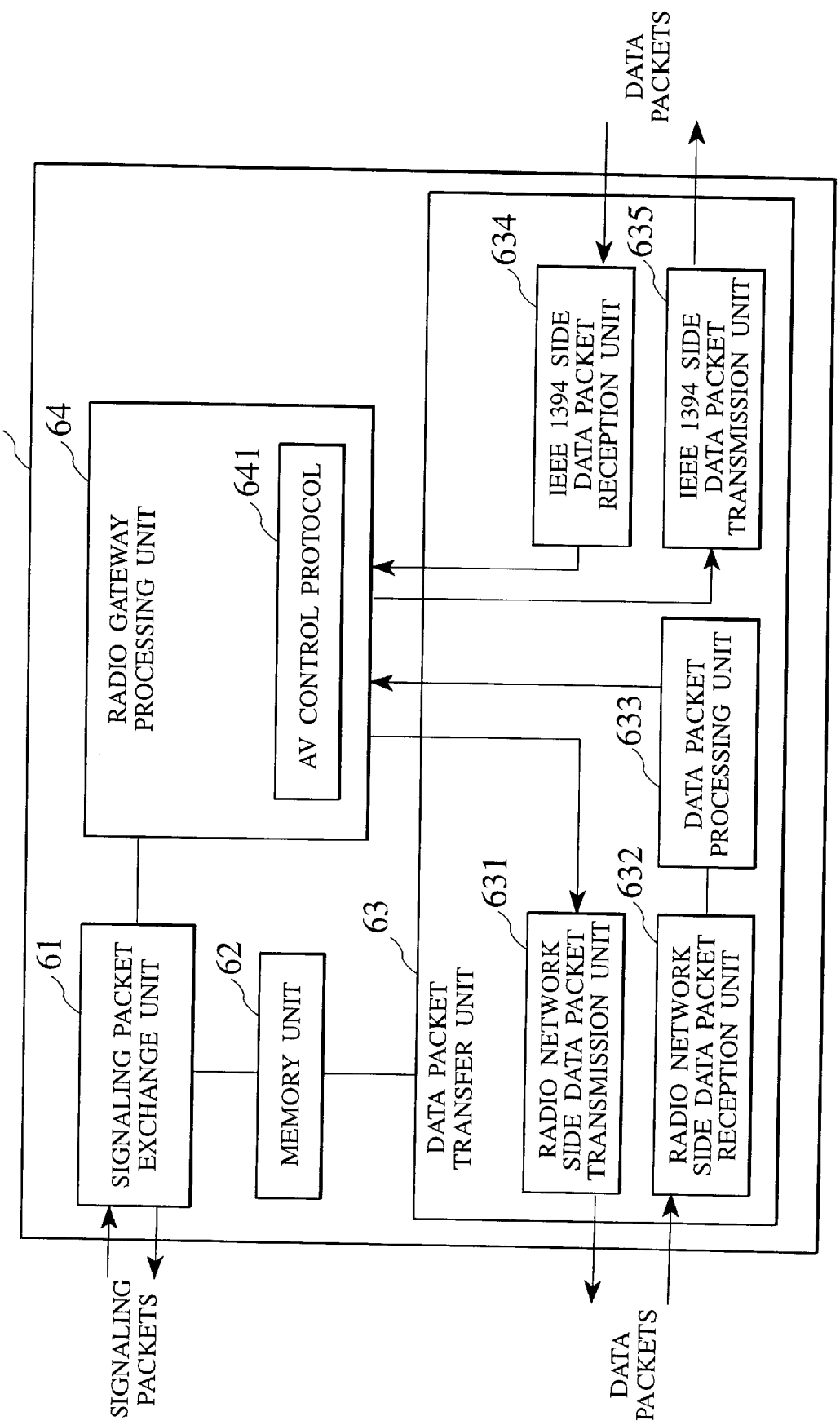
FIG. 16 is a block diagram showing an exemplary configuration of a radio gateway device according to the present invention.

It is also to be noted that each radio gateway in the above described embodiments can be realized by a radio gateway device 60 as shown in FIG. 16, for connecting an IEEE 1394 bus with a radio network for carrying out data transfer after establishing a logical connection between radio terminals or gateways prior to data transfer between radio terminals or gateways.

This radio gateway device 60 of FIG. 16 comprises: a signaling packet exchange unit 61 for exchanging signaling packets at a datalink layer with a correspondent radio terminal or gateway on the radio network prior to an exchange of data packets on which information regarding an AV control protocol is loaded, where each signaling packet contains a channel identifier indicating a logical channel that is set up for transferring the data packets and a protocol identifier indicating the AV control protocol; a memory unit 62 for storing a correspondence information among the protocol identifier, the channel identifier that is set up for the radio gateway device, and the channel identifier that is set up for the correspondent radio terminal or gateway, which are obtained through an exchange of the signaling packets; a data packet transfer unit 63 for transferring the data packets from a radio network side to an IEEE 1394 bus side or from the IEEE 1394 bus side to the radio network side, according to the correspondence information; and a radio gateway processing unit 64 for carrying out the processing of the radio gateway.

The data packet transfer unit 63 includes a radio network side data packet transmission unit 631 for transmitting an outgoing data packet on which the command of the AV control protocol or the response of the AV control protocol is loaded, to the IEEE 1394 side, by describing a register offset value indicating the command of the AV control protocol or a register offset value indicating the response of the AV control protocol in the outgoing data packet; a radio network side data packet reception unit 632 for receiving an incoming data packet to be transferred to the IEEE 1394 side from the radio network side; a data packet processing unit 633 for checking whether a message type of the incoming data packet is a command of the AV control protocol or a response of the AV control protocol when the channel identifier that is set up for the radio gateway device is described in the incoming data packet; an IEEE 1394 side data packet reception unit 634 for receiving an incoming data packet to be transferred to the radio network side from the IEEE 1394 side; and an IEEE 1394 side data packet transmission unit 635 for transmitting an outgoing data packet on which a command of the AV control protocol or a response of the AV control protocol is loaded, to the radio network side, by describing the channel identifier that is set up for the correspondent radio terminal or gateway in the outgoing data packet, when a register offset value indicating the command of the AV control protocol or a register offset value indicating the response of the AV control protocol is described in the incoming data packet.

The AV control protocol 641 is provided in the radio gateway processing unit 64.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the radio terminal and the radio gateway of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information transfer method for transferring information regarding an AV control protocol in a radio system for carrying out data transfer after establishing a logical connection between radio terminals or gateways prior to data transfer between the radio terminals or gateways, the method comprising the steps of:

exchanging signaling packets for signaling at a datalink layer between the radio terminals or gateways prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from each radio terminal or gateway indicates a channel identifier that is set up for the each radio terminal or gateway and a signaling packet received from a correspondent radio terminal or gateway indicates a channel identifier that is set up for the correspondent radio terminal or gateway;

storing at the each radio terminal or gateway a correspondence information obtained through an exchange of the signaling packets, the correspondence information indicating a correspondence among the protocol identifier, the channel identifier that is set up for the each radio terminal or gateway, and the channel identifier that is set up for the correspondent radio terminal or gateway; and transferring the data packets between the radio terminals or gateways, according to the correspondence information.

2. The method of claim 1, wherein the transferring step transmits an outgoing data packet by attaching the channel identifier that is set up for the correspondent radio terminal or gateway and that is obtained by referring to the correspondence information.

3. The method of claim 1, wherein the transferring step receives an incoming data packet from the correspondent radio terminal or gateway, and gives the information regarding the AV control protocol as contained in the incoming data packet to the AV control protocol, when the incoming data packet is Judged as a packet regarding the AV control protocol by referring to the correspondence information according to the channel identifier ass described in the incoming data packets.

4. The method of claim 1, wherein the exchanging step uses the channel identifier indicating the logical channel that is set up at a time of the signaling.

5. The method of claim 1, wherein the exchanging step uses the channel identifier indicating the logical channel that is set up prior to the signaling.

6. The method of claim 1, wherein the exchanging step uses the channel identifier indicating the logical channel that is specified with respect to all radio terminals or gateways in advance.

7. The method of claim 1, wherein values of the protocol identifier are defined separately for different message types in the AV control protocol, and the exchanging step carries out the signaling for each message type of the AV control protocol, using different channel identifiers for different message types in the AV control protocol.

8. An information transfer method for transferring information regarding an AV control protocol at a radio gateway connecting an IEEE 1394 bus with a radio network for carrying out data transfer after establishing a logical connection between the radio terminals or gateways prior to data transfer between radio terminals or gateways, the method comprising the steps of:

exchanging signaling packets for signaling at a datalink layer with a correspondent radio terminal or gateway on the radio network prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio gateway indicates a channel identifier that is set up for the radio gateway and a signaling packet received from the correspondent radio terminal or gateway indicates a channel identifier that is set up for the correspondent radio terminal or gateway;

storing a correspondence information obtained through an exchange of the signaling packets, the correspondence information indicating a correspondence among the protocol identifier, the channel identifier that is set up for the radio gateway, and the channel identifier that is set up for the correspondent radio terminal or gateway; and transferring the data packets from a radio network side to an IEEE 1394 bus side or from the IEEE 1394 bus side to the radio network side, according to the correspondence information.

9. The method of claim 8, wherein the transferring step includes the steps of:

receiving an incoming data packet to be transferred to the IEEE 1394 side from the radio network side;

checking whether a message type of the incoming data packet is a command of the AV control protocol or a response of the AV control protocol when the channel identifier that is set up for the radio gateway is described in the incoming data packet; and transmitting an outgoing data packet on which the command of the AV control protocol or the response of the AV control protocol is loaded, to the IEEE 1394 side, by describing a register offset value indicating the command of the AV control protocol or a register offset value indicating the response of the AV control protocol in the outgoing data packet.

10. The method of claim 8, wherein the transferring step includes the steps of:

receiving an incoming data packet to be transferred to the radio network side from the IEEE 1394 side; and transmitting an outgoing data packet on which a command of the AV control protocol or a response of the AV control protocol is loaded, to the radio network side, by describing the channel identifier that is set up for the correspondent radio terminal or gateway in the outgoing data packet, when a register offset value indicating the command of the AV control protocol or a register offset value indicating the response of the AV control protocol is described in the incoming data packet.

11. The method of claim 8, wherein the exchanging step uses the channel identifier indicating the logical channel that is set up at a time of the signaling.

12. The method of claim 8, wherein the exchanging step uses the channel identifier indicating the logical channel that is set up prior to the signaling.

13. The method of claim 8, wherein the exchanging step uses the channel identifier indicating the logical channel that is specified with respect to all radio terminals or gateways in advance.

14. The method of claim 8, wherein values of the protocol identifier are defined separately for different message types in the AV control protocol, and the exchanging step carries out the signaling for each message type of the AV control protocol, using different channel identifiers for different message types in the AV control protocol.

15. The method of claim 8, wherein the transferring step transmits data packets on which one set of the command of the AV control protocol and the response of the AV control protocol are loaded by attaching an identical transaction identifier to the data packets.

16. A radio terminal device in a radio system for carrying out data transfer after establishing a logical connection between radio terminals or gateways prior to data transfer between the radio terminals or gateways, the radio terminal device comprising:

a signaling packet exchange unit configured to exchange signaling packets for signaling at a datalink layer with a correspondent radio terminal or gateway prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio terminal device indicates a channel identifier that is set up for the radio terminal device and a signaling packet received from the correspondent radio terminal or gateway indicates a channel identifier that is set up for the correspondent radio terminal or gateway;

a memory unit configured to store a correspondence information obtained through an exchange of the signaling packets, the correspondence information indicating a correspondence among the protocol identifier, the channel identifier that is set up for the radio terminal device, and the channel identifier that is set up for the correspondent radio terminal or gateway; and a data packet exchange unit configured to exchange the data packets with the correspondent radio terminal or gateway, according to the correspondence information.

17. The radio terminal device of claim 16, wherein the data packet exchange unit includes:

a data packet transmission unit configured to transmit an outgoing data packet by attaching the channel identifier that is set up for the correspondent radio terminal or gateway and that is obtained by referring to the correspondence information.

18. The radio terminal device of claim 16, wherein the data packet exchange unit includes:

a data packet reception unit configured to receive an incoming data packet from the correspondent radio terminal or gateway; and a data packet processing unit configured to give the information regarding the AV control protocol as contained in the incoming data packet to the AV control protocol, when the incoming data packet is judged as a packet regarding the AV control protocol by referring to the correspondence information according to the channel identifier as described in the incoming data packet.

19. The radio terminal device of claim 16, wherein the signaling packet exchange unit uses the channel identifier indicating the logical channel that is set up at a time of the signaling.

20. The radio terminal device of claim 16, wherein the signaling packet exchange unit uses the channel identifier indicating the logical channel that is set up prior to the signaling.

21. The radio terminal device of claim 16, wherein the signaling packet exchange unit uses the channel identifier indicating the logical channel that is specified with respect to all radio terminals or gateways in advance.

22. The radio terminal device of claim 16, wherein values of the protocol identifier are defined separately for different message types in the AV control protocol, and the signaling packet exchange unit carries out the signaling for each message type of the AV control protocol, using different channel identifiers for different message types in the AV control protocol.

23. A radio gateway device connecting an IEEE 1394 bus with a radio network for carrying out data transistor after establishing a logical connection between the radio terminals or gateways prior to data transfer between radio terminals or gateways, the radio gateway device comprising:

a signaling packet exchange unit configured to exchange signaling packets for signaling at a datalink layer with a correspondent radio terminal or gateway on the radio network prior to an exchange of data packetts on which information regarding an AV control protocol is loaded, each signaling packet containing a channel identifier indicating a logical channel that is set up for transferring the data packets and a protocol identifier indicating the AV control protocol, such that a signaling packet transmitted from the radio gateway device indicates a channel identifier that is set up for the radio gateway device and a signaling packet received from the correspondent radio terminal or gateway indicates a channel identifier that is set up for the correspondent radio terminal or gateway;

a memory unit configured to store a correspondence information obtained through an exchange of the signaling packets, the correspondence information indicating a correspondence among the protocol identifier, the channel identifier that is set up for the radio gateway device, and the channel identifier that is set up for the correspondent radio terminal or gateway; and a data packet transfer unit configured to transfer the data packets from a radio network side to an IEEE 1394 bus side or from the IEEE 1394 bus side to the radio network side, according to the correspondence information.

24. The radio gateway device of claim 23, wherein the data packet transfer unit includes:

a radio network side data packet reception unit configured to receive an incoming data packet to be transferred to the IEEE 1394 side from the radio network side;

a data packet processing unit configured to check whether a message type of the incoming data packet is a command of the AV control protocol or a response of the AV control protocol when the channel identifier that is set up for the radio gateway device is described in the incoming data packet; and a radio network side data packet transmission unit configured to transmit an outgoing data packet ors which the command of the AV control protocol or the response of the AV control protocol is loaded, to the IEEE 1394 side, by describing a register offset value indicating the command of the AV control protocol or a register offset value indicating the response of the AV control protocol in the outgoing data packet.

25. The radio gateway device of claim 23, wherein the data packet transfer unit includes:

an IEEE 1394 side data packet reception unit configured to receive an incoming data packet to be transferred to the radio network side from the IEEE 1394 side; and an IEEE 1394 side data packet transmission unit configured to transmit an outgoing data packet on which a command of the AV control protocol or a response of the AV control protocol is loaded, to the radio network side, by describing the channel identifier that is set up for the correspondent radio terminal or gateway in the outgoing data packet, when a register offset value indicating the command of the AV control protocol or a register offset value indicating the response of the AV control protocol is described in the incoming data packet.

26. The radio gateway device of claim 23, wherein the signaling packet exchange unit uses the channel identifier indicating the logical channel that is set up at a time of the signaling.

27. The radio gateway device of claim 23, wherein the signaling packet exchange unit uses the channel identifier indicating the logical channel that is set up prior to the signaling.

28. The radio gateway device of claim 23, wherein the signaling packet exchange unit uses the channel identifier indicating the logical channel that is specified with respect to all radio terminals or gateways in advance.

29. The radio gateway device of claim 23, wherein values of the protocol identifier are defined separately for different message types in the AV control protocol, and the signaling packet exchange unit carries out the signaling for each message type of the AV control protocol, using different channel identifiers for different message types in the AV control protocol.

30. The radio gateway device of claim 23, wherein the data packet transfer unit transmits data packets on which one set of the command of the AV control protocol and the response of the AV control protocol are loaded by attaching an identical transaction identifier to the data packets.

31. A computer usable medium having computer readable program codes embodied therein for causing a computer to function as a radio terminal device in a radio system for carrying out data transfer after establishing a logical connection between the radio terminals or gateways prior to data transfer between radio terminals or gateways, the computer readable program codes including:

a first computer readable program code for causing said computer to exchange signaling packets for signaling at a datalink layer with a correspondent radio terminal or gateway prior to an exchange of data packets on which the information regarding the AV control protocol is loaded, each signaling packet containing a channel identifier indicating a logical channel that is set up for transferring the data packets and a protocol identifier indicating the AV control protocol, such that a signaling packet transmitted from the radio terminal device indicates a channel identifier that is set up for the radio terminal device and a signaling packet received from the correspondent radio terminal or gateway indicates a channel identifier that is set up for the correspondent radio terminal or gateway;

a second computer readable program code for causing said computer to store a correspondence information obtained through an exchange of the signaling packets, the correspondence information indicating a correspondence among the protocol identifier, the channel identifier that is set up for the radio terminal device, and the channel identifier that is set up for the correspondent radio terminal or gateway; and a third computer readable program code for causing said computer to exchange the data packets with the correspondent radio terminal or gateway, according to the correspondence information.

32. A computer usable medium having computer readable program codes embodied therein for causing a computer to function as a radio gateway device connecting an IEEE 1394 bus with a radio network for carrying out data transfer after establishing a logical connection between radio terminals or gateways prior to data transfer between the radio terminals or gateways, the computer readable program codes including:

a first computer readable program code for causing said computer to exchange signaling packets at a datalink layer with a correspondent radio terminal or gateway on the radio network prior to an exchange of data packets on which information regarding an AV control protocol is loaded, each signaling packet containing a channel identifier indicating a logical channel that is set up for transferring the data packets and a protocol identifier indicating the AV control protocol, such that a signaling packet transmitted from the radio gateway device indicates a channel identifier that is set up for the radio gateway device and a signaling packet received from the correspondent radio terminal or gateway indicates a channel identifier that is set up for the correspondent radio terminal or gateway;

a second computer readable program code for causing said computer to store a correspondence information obtained through an exchange of the signaling packets, the correspondence information indicating a correspondence among the protocol identifier, the channel identifier that is set up for the radio gateway device, and the channel identifier that is set up for the correspondent radio terminal or gateway; and a third computer readable program code for causing said computer to transfer the data packets from a radio network side to an IEEE 1394 bus side or from the IEEE 1394 bus side to the radio network side, according to the correspondence information.

* * * * *